United States Patent [19]

Baskent et al.

[11] 4,331,555

[45] May 25, 1982

[54] USE OF ORGANOSILOXANE COMPOSITIONS AS FOAM STABILIZERS IN FLEXIBLE POLYESTER POLYURETHANE FOAM

[75] Inventors: Feyyaz O. Baskent, Mahopac; Michael R. Sandner, Chappaqua, both of N.Y.

[73] Assignee: Union Carbide Corporation, Danbury, Conn.

[21] Appl. No.: 191,520

[22] Filed: Sep. 29, 1980

[51] Int. Cl.³ ............................................. B01F 17/54
[52] U.S. Cl. .................................. 252/351; 252/312; 252/356; 521/111
[58] Field of Search ....................... 252/351, 312, 356; 521/111

[56] References Cited

U.S. PATENT DOCUMENTS

| | | | |
|---|---|---|---|
| 2,846,458 | 8/1958 | Haluska | 252/351 X |
| 2,872,435 | 2/1959 | Speier | 260/46.5 |
| 3,359,212 | 12/1967 | Bailey | 252/351 X |
| 3,594,334 | 7/1971 | Marlin | 260/2.5 |
| 3,637,783 | 1/1972 | Haluska | 252/351 X |
| 3,657,305 | 4/1972 | Morehouse | 260/448.2 B |
| 3,686,254 | 8/1972 | Morehouse | 260/448.7 B |
| 3,741,917 | 6/1973 | Morehouse | 260/2.5 AII |
| 3,793,360 | 2/1974 | Prokai et al. | 260/448.2 B |
| 3,879,433 | 4/1975 | Omietanski et al. | 260/448.2 B |
| 3,905,924 | 9/1975 | Prokai | 260/448.2 N |
| 3,954,824 | 5/1976 | Prokai et al. | 260/448.8 R |
| 3,979,419 | 9/1976 | Prokai et al. | 260/448.8 R |

*Primary Examiner*—Richard D. Lovering
*Attorney, Agent, or Firm*—Reynold J. Finnegan

[57] ABSTRACT

A process for manufacturing low density flexible polyester polyurethane foam utilizing as a foam stabilizer selected low molecular weight (e.g., 400 to 1500) organosiloxane compositions containing monomeric units A, B and C wherein A is a monofunctional trimethylsiloxy unit $[(CH_3)_3SiO_{\frac{1}{2}}]$, B is a difunctional dimethylsiloxy unit $[(CH_3)_2SiO_{2/2}]$ and C is a difunctional organomethylsiloxy unit $[R(CH_3)SiO_{2/2}]$ where R is a cyano-, ether-, hydroxy- or phenyl-organo modifying moiety, and in which the unit ratio of B to C in each organosiloxane composition is from 1 to 4 inclusive; solutions of such organosiloxane compositions; and the foams derived from such process.

1 Claim, No Drawings

USE OF ORGANOSILOXANE COMPOSITIONS AS FOAM STABILIZERS IN FLEXIBLE POLYESTER POLYURETHANE FOAM

FIELD OF THE INVENTION

This invention relates to a process for manufacturing low density flexible polyester polyurethane foam utilizing selected low molecular weight organosiloxane compositions as foam stabilizers.

BACKGROUND OF THE INVENTION

It is well known that the urethane linkages of polyurethane foams are formed by the exothermic reaction of a polyfunctional isocyanate and a polyfunctional active hydrogen-containing compound in the presence of a catalyst, and that the cellular structure of the foam is provided by gas evolution and expansion during the urethane-forming reaction. In accordance with the "one-shot process" which is the most widely used industrial technique, direct reaction is effected between all of the raw materials which include the polyisocyanate, the active hydrogen-containing compound, the catalyst system, blowing agent, surfactant, and, optionally, a flame retardant. A major function of the surfactant is to stabilize the polyurethane foam, that is, prevent collapse of the foam until the foamed product has developed sufficient gel strength to become self-supporting.

It is also well known that suitable active hydrogen-containing compounds include polyether polyols and polyester polyols. From the standpoint of their chemical structure, therefore, polyurethane foams are usually classified as polyether and polyester polyurethane foams, respectively. Polyurethane foams also differ with respect to their physical structure and, from this standpoint, are generally classified as flexible, semi-flexible or rigid foams.

Although certain techniques of polyurethane foam manufacture such as the "one-shot process" and certain components of the polyurethane foam formulation such as the polyisocyanates, amine catalyst and blowing agent, are generally useful, a specific problem associated with the production of a particular type of polyurethane foam and the solution thereto are often peculiar to the particular chemical and physical structure of the desired foamed product. Thus, a significant development in the production of a polyether polyurethane foam or a rigid polyurethane foam, for example, may not be generally applicable to the production of other foamed products. In particular, the efficacy of the foam stabilizer is usually selective with respect to the formation of a particular type of foam. For example, although flexible polyester polyurethane foam was originally made using conventional organic surfactants or emulsifiers, such compounds were not effective for the manufacture of flexible polyether polyurethane foam. As polyurethane foam technology advanced and the end-uses became more varied, it became apparent that certain deficiencies in the quality of flexible polyester polyurethane foam such as the presence of splits and a nonuniform cell structure were attributable, at least in part, to the organic surfactants employed. However, the mere substitution of the organic surfactants with various polysiloxane-polyoxyalkylene block copolymers which had been used as foam stabilizers with satisfactory results in the production of other types of polyurethane foams (e.g., in the production of polyether polyurethane foams and certain rigid polyester polyurethane foams), did not produce completely satisfactory flexible polyester polyurethane foams.

The search for improved surfactants for stabilization of low density flexible polyester polyurethane foams is further complicated by the need for a foam stabilizing surfactant having wide processing latitude (i.e., a foam stabilizing surfactant which, when employed in various concentration amounts of wide latitude, produces polyurethane foams having desirable physical properties including high cell counts). For example, when low cell counts or other undesirable physical properties appear in low density flexible polyester polyurethane foam, an increased or decreased amount of foam stabilizing surfactant is applied to remedy the particular problem. However, increasing or decreasing the amount of foam stabilizing surfactant in low density flexible polyester polyurethane foam formulation will not necessarily result in high cell counts or other desirable physical properties. Therefore, a foam stabilizing surfactant having wide processing latitude is essential for overcoming variations encountered in low density flexible polyester polyurethane foam formulation.

A significant development in polyester polyurethane foam manufacture was the discovery that a satisfactory combination of uniform cell structure and freedom from splits was achieved by using a particular combination of foam stabilizing ingredients. This latter combination comprises (a) an anionic organic surfactant that is soluble in the polyester polyol reactant at room temperature and that is capable of lowering the surface tension of the polyester resin reactant when dissolved therein and (b) a polysiloxane-polyoxyalkylene block copolymer surfactant characterized by a particular molecular weight (from 500 to 17,000), siloxane content (from 14 to 40 weight percent based on the weight of the copolymer) and oxyethylene content (at least 75 weight percent based on the total amount of oxyalkylene groups in the copolymer). This particular advance in polyester polyurethane foam manufacture is described in greater detail in U.S. Pat. No. 3,594,334. A foam stabilizer of the class described in the latter patent is that referred to herein as comparative Organosiloxane Composition PP. It is found that comparative Organosiloxane Composition PP is capable of stabilizing low density polyester polyurethane foam having some desirable physical properties at a very narrow concentration range. However, comparative Organosiloxane Composition PP does not perform as well as desired in all cases in overcoming the many variations encountered in low density flexible polyester polyurethane foam formulation.

Several other patents broadly disclose the use of organosiloxane compositions ranging from low molecular weight to high molecular weight but exemplifying only high molecular weight compositions, as foam stabilizers in flexible polyester polyurethane foam formulation. U.S. Pat. No. 3,979,419 exemplifies high molecular weight (e.g., 2700 to 4600) organosilicone compositions modified by both cyanobearing ether groups and polyoxyalkylene units as demonstrated by Surfactants A through J in the working Examples. These organosilicone compositions are useful as foam stabilizers in the manufacture of flexible polyester polyurethane foam and offer particular advantage in the formation of flame-retarded foam. U.S. Pat. No. 3,954,824 exemplifies high molecular weight (e.g., 2500 to 5400) organosilicone polymers modified by both cyanoalkyl groups and polyoxyalkylene units as demonstrated by Surfactants A through F in the working Examples. These organosilicone polymers are also useful as foam stabilizers in the manufacture of flexible polyester polyurethane foam including flame-retarded foam. U.S. Pat. No. 3,793,360 relates to organosilicone polymers containing monomeric units A, B and C where A is an inorganic tetrafunctional unit ($SiO_{4/2}$) in which each of the four valences of silicon is associated with oxygen, B is a polyfunctional siloxy unit in which silicon is bonded to at least one organic moiety bearing a polyoxyalkylene chain, and C is a monofunctional triorganosiloxy unit. These organosilicone polymers have beneficial utility as foam stabilizers in the manufacture of flexible polyester polyurethane foam. However, none of the latter mentioned patents exemplify low molecular weight organosiloxane compositions as described in this invention nor disclose their use as foam stabilizers in the manufacture of low density flexible polyester polyurethane foam.

Several other patents broadly disclose organosiloxane compositions having a wide molecular weight range including low molecular weight organosiloxane compositions as described in this invention. U.S. Pat. No. 3,905,924 discloses cyanoalkyl modified siloxane fluids and the use of these fluids as foam stabilizers in the production of high resilience polyether urethane foam. U.S. Pat. No. 2,872,435 describes (cyanoalkoxy)alkyl substituted organosilicon compounds having peculiar properties in their own rights as fluids, rubbers and resins. The (cyanoalkoxy)alkyl substituted organosilicon compounds are employed as intermediates for the preparation of amide or carboxylic substituted organosilicon compounds and further provide organosilicon rubbers and resins which have an improved resistance to attack by organic solvents and oils. U.S. Pat. No. 3,741,917 relates to ether modified siloxane block copolymers and the use of these copolymers as foam stabilizers in the production of cold cure polyether urethane foam having high resiliency. U.S. Pat. No. 3,879,433 discloses certain hydroxyalkylsiloxanes that are particularly useful as foam stabilizers in rigid polyether polyurethane foam formulation. U.S. Pat. No. 3,686,254 and U.S. Pat. No. 3,657,305 describe aralkyl modified siloxane fluids useful in the preparation of siloxane-polyoxyalkylene block copolymers. The siloxane-polyoxyalkylene block copolymers have beneficial utility as foam stabilizers in the production of open-cell flexible polyether polyurethane foams having reduced flammability. However, none of the latter mentioned patents exemplify the use of low molecular weight organosiloxane compositions described in this invention as foam stabilizers in the manufacture of low density flexible polyester polyurethane foam.

It is desirable, therefore, and is a primary object of this invention, to provide a process for manufacturing low density flexible polyester polyurethane foam utilizing as a foam stabilizer selected organosiloxane compositions having wide processing latitude.

A further object is to provide low density flexible polyester polyurethane foams characterized by desirable physical properties including high cell counts.

Yet another object is to provide solutions, consisting of an organosiloxane composition foam stabilizer and certain other component(s) of suitable compatability, to facilitate the handling of foam stabilizers in conventional polyester polyurethane foam formulations.

Various other objects and advantages of this invention will become apparent to those skilled in the art from the accompanying description and disclosure.

SUMMARY OF THE INVENTION

This invention is based on the discovery that certain low molecular weight organosiloxane compositions having a wide processing latitude can be used as foam stabilizers in the manufacture of low density flexible polyester polyurethane foam. The present invention provides for the use of four types of low molecular weight (e.g., 400 to 1500) organosiloxane compositions as foam stabilizers in low density flexible polyester polyurethane foam formulation. Each of these four types of organosiloxane compositions contain monomeric units A, B and C wherein A is a monofunctional trimethylsiloxy unit [$(CH_3)_3SiO_1$], B is a difunctional dimethylsiloxy unit [$(CH_3)_2SiO_{2/2}$], and C is a difunctional organomethylsiloxy unit [$R(CH_3)SiO_{2/2}$] where R is a cyano-, ether-, hydroxy- or phenyl- organo modifying moiety. The ratio of B units to C units in each organosiloxane composition is from 1 to 4 inclusive. The use of these organosiloxane compositions as foam stabilizers unexpectedly produce low density flexible polyester polyurethane foams with desirable physical properties including high cell counts in comparison to current flexible polyester polyurethane foam stabilizers.

The organosiloxane compositions are selected from the group consisting of: (a) a cyano-organosiloxane composition having the average formula,

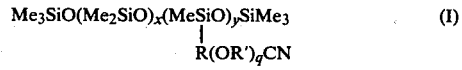

wherein Me is a methyl group, R is an alkylene group of from 2 to 6 carbon atoms inclusive, R' is an alkylene group of from 2 to 4 carbon atoms inclusive, x has a value of at least 1, y has a value of at least 1, q has a value of 0 or 1, the ratio of x to y has a value from 1 to 4 inclusive, and the molecular weight is from about 400 to about 1500; (b) an ether-organosiloxane composition having the average formula,

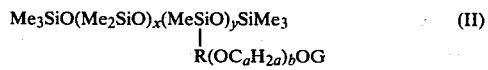

wherein Me is a methyl group, R is an alkylene group of from 2 to 6 carbon atoms inclusive, G is an organic cap, x has a value of at least 1, y has a value of at least 1, a has an average value from 2 to 4 inclusive, b has an average value from 2 to 4 inclusive, the ratio of x to y has a value from 1 to 4 inclusive, and the molecular weight is from about 400 to about 1500; (c) a hydroxy-organosiloxane composition having the average formula,

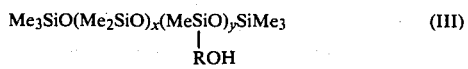

wherein Me is a methyl group, R is an alkylene group of from 2 to 6 carbon atoms inclusive, x has a value of at least 1, y has a value of at least 1, the ratio of x to y has a value from 1 to 4 inclusive, and the molecular weight is from about 400 to about 1500; and (d) a phenyl-organosiloxane composition having the average formula,

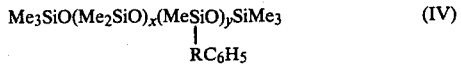
$$Me_3SiO(Me_2SiO)_x(MeSiO)_ySiMe_3 \quad (IV)$$
$$| \quad RC_6H_5$$

wherein Me is a methyl group, R is an alkylene group of from 2 to 6 carbon atoms inclusive, x has a value of at least 1, y has a value of at least 1, the ratio of x to y has a value from 1 to 4 inclusive, and the molecular weight is from about 400 to about 1500.

In the above formulae, R and R' can be linear or branched alkylene radicals. Illustrative of the linear and branched alkylene radicals encompassed by R are: ethylene; 1-propylene; 1,3-propylene; 1,2-propylene; 1-butylene; 1,4-butylene; 1,2-butylene; 2,3-butylene; 1,5-pentylene; 1,2-pentylene; and 1,6-hexylene. Illustrative of the linear and branched alkylene radicals encompassed by R' are: ethylene; 1-propylene; 1,3-propylene; 1,2-propylene; 1-butylene; 1,4-butylene; 1,2-butylene; and 2,3-butylene. In the above formula (II), G can be a monovalent hydrocarbon group having from 1 to 12 carbon atoms. Illustrative of monovalent hydrocarbon groups having from 1 to 12 carbon atoms encompassed by G are: methyl, ethyl, propyl, butyl, phenyl, benzyl, phenylethyl, and the like.

More specifically the present invention relates to the use of these organosiloxane compositions as cell stabilizers in a process for preparing low density flexible polyester polyurethane foam having a density of no greater than 2.0 pounds per cubic foot (preferably no greater than 1.75 pounds per cubic foot), said process comprising simultaneously reacting and foaming a reaction mixture containing: (a) a polyester polyol an average of at least two hydroxyl groups per molecule; (b) a polyisocyanate having an average of at least two isocyanato groups per molecule, said polyester polyol and said polyisocyanate being present in the mixture in a major amount and in a relative amount required to produce the polyurethane foam; (c) a blowing agent in a minor amount sufficient to foam the reaction mixture; (d) a catalytic amount of catalysts for the production of polyurethane foam; (e) a foam stabilizer in a minor amount sufficient to stabilize the polyurethane foam comprising an organosiloxane composition as described in formulae (I), (II), (III) or (IV) hereinabove; and, optionally, (f) a flame retardant in a minor amount sufficient to retard the flammability of the polyurethane foam. Low density flexible polyester polyurethane foams obtained according to the process of this invention exhibit excellent physical properties including high cell counts. In addition, the organosiloxane compositions are operable over a broad range (e.g., 0.15 to 4.0 parts by weight per hundred parts by weight of the polyester polyol) and can be used in solution and consequently are easy to meter and pump during foam formulation.

DESCRIPTION OF PREFERRED EMBODIMENTS

The organosiloxane compositions of formulae (I), (II), (III) and (IV) can be prepared by several known methods. For example, a preferred method involves the acid-catalyzed equilibration of hexamethyldisiloxane (Me₃SiOSiMe₃) and cyclic dimethylsiloxane tetramer (Me₂SiO)₄ with poly[organo(methyl)siloxane][R-(Me)SiO] where R is a cyano-, ether-, hydroxy- or phenyl- organo modifying moiety. This method is demonstrated in the working Examples (e.g., Example I) described hereinbelow. Another preferred method for preparing the above-identified organosiloxane compositions involves the platinum-catalyzed addition of a hydrosiloxane fluid to an alphaolefinic compound [i.e., $CH_2=CHCH_2CN$, $CH_2=CHCH_2OCH_2CH_2CN$, $CH_2=CHCH_2(OC_2H_4)_3OCH_3$,

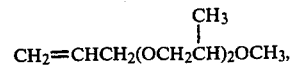
$$CH_3$$
$$|$$
$$CH_2=CHCH_2(OCH_2CH)_2OCH_3,$$

$CH_2=CHC(CH_3)_2OH$ and $CH_2=CHCH_2C_6H_5$]. This method is also demonstrated in the working Examples (e.g., Example V) described hereinbelow. A further method for preparing the organosiloxane compositions described in the present invention includes a base-catalyzed equilibration reaction similar to the acid-catalyzed equilibration reaction described above. All three of these methods provide organosiloxane compositions having beneficial utility as foam stabilizers in the manufacture of low density flexible polyester polyurethane foam.

The relative amount of organosiloxane composition used to make the low density flexible polyester polyurethane foam can vary over wide ranges and are generally employed in amounts ranging from about 0.15 to about 4.0 parts by weight or greater per hundred parts by weight of the polyester polyol starting material. Generally there is no commensurate advantage to using amounts of the organosiloxane composition greater than about four parts by weight, while the use of amounts below 0.15 parts by weight can result in foam instability. Preferably the organosiloxane compositions are employed in amounts ranging from 0.2 to about 2.0 parts by weight per hundred parts by weight of the polyester polyol starting material.

The organosiloxane compositions described hereinabove are effective as stabilizers of low density flexible polyester polyurethane foams and can, therefore, be used as such without the need for combination with other ingredients or additives. The organosiloxane compositions can be employed as a 100 percent active stream, or they can be employed in dilute form as a solution in polar solvents (e.g., glycols) or non-polar organic solvents such as normally liquid aliphatic and aromatic unsubstituted and halogen-substituted hydrocarbons (e.g., heptane, xylene, toluene, chlorobenzenes and the like). Such organosiloxane composition-solvent solutions can help serve to eliminate any mixing, metering or settling problems. Preferably the solvent selected should be one in which the organosiloxane composition is substantially soluble. For example, it is preferred that at least five parts by weight of the organosiloxane composition be soluble in 95 parts by weight of solvent. More preferably the minimum percentage of organosiloxane composition in the organosiloxane composition-solvent solution should be in the range of at least about ten to at least about 30 weight percent. Of course, it is understood that such solvents need not be employed and that the maximum percentage of organosiloxane composition in said organosiloxane composition-solvent solutions is not critical. Moreover, when employed such organosiloxane composition-solvent solutions should of course be correlated to the amounts of active organosiloxane composition that may be employed per hundred parts by weight of the polyester polyol starting material as outlined above.

It is often the preferred practice of foam manufacturers to premix the foam stabilizer, amine catalyst and water (which is the usual source of at least part of the blowing action), and to feed the aqueous premixture to the foam-producing reaction mixture as a single stream. The mere mixing of the organosiloxane compositions described in this invention with the catalyst and water, however, forms a heterogeneous mixture which detracts from the processing advantage of adding these components as a combined stream rather than as individual streams. The problem of premix incompatibility is overcome by providing homogeneous aqueous premixtures comprising the organosiloxane composition, amine catalyst, an organic acidic component and, as an additional ingredient, either a water soluble organic surfactant, water soluble glycol, or both of the latter two types of components. Although these various organic additives can be introduced directly to the aqueous premixture of foam stabilizer and catalyst, the formation of clear, homogeneous aqueous solutions is facilitated by blending the additives with the foam stabilizer (that is, the organosiloxane composition) and combining the resulting blend with water and the amine catalyst system. In accordance with an embodiment of this invention, therefore, solution compositions are provided comprising the organosiloxane compositions described in this invention, the aforesaid organic acidic component, and one or both of an organic surfactant and glycol. The organosiloxane composition is present in the solution compositions in an amount of from about 10 to about 80 parts by weight per 100 parts by weight of the solution.

The aforesaid organic acidic component comprises the saturated and unsaturated aliphatic and cycloaliphatic carboxylic acids containing from 15 to 20 carbon atoms. Illustrative of suitable acidic components are the fatty acids such as, for example, palmitic, stearic, palmitoleic, oleic, linoleic, linolenic and ricinoleic acids, resin acids of the abietic and pimaric type; and any combination of the aforesaid acids as well as industrial by-products and naturally-occurring materials comprising such acids. An especially suitable acidic component of the solution compositions and aqueous premixtures is tall oil which is a byproduct of sulfate digestion of wood pulp and is composed largely of fatty acids (oleic, linoleic, linolenic and palmitic acids) and resin acids, and a minor amount of neutral material such as fatty acid esters.

The above-described organic acidic component is present in the solution compositions in an amount of from about 5 to about 90 parts by weight per 100 parts by weight of organosiloxane composition present in the solution.

The water-soluble organic surfactant which can be a component of the solution compositions may be of the nonionic, anionic, cationic or amphoteric types, including multiple combinations of the same or different types thereof. Illustrative of the non ionic types of organic surfactants which can be employed are: the poly(oxyalkylene) ethers of the higher alcohols having from 10 to 18 carbon atoms including mixtures thereof; polyoxyalkylene ethers of alkyl-substituted phenols in which the alkyl group can have from 6 to 15 carbon atoms; and corresponding polythioalkylene adducts of the aforesaid higher alcohols and phenols. The length of the ether chain is such that appropriate hydrophilic character is provided to balance the hydrophobic portion derived from the alcohol or phenol and render the compound soluble in water. The chain may contain oxyethylene units either as essentially the sole type of unit or oxyethylene in combination with a minor amount of oxypropylene. It is preferred that the hydrophilic portion of the non ionic surfactants be composed essentially of oxyethylene monomeric units. Usually the average number of such —$OC_2H_4$— units ranges from about 4 to about 20, although upwards of 40 such units can also be present.

Typical examples of non ionic surfactants which can be used as components of the solution compositions are the adducts produced by reaction of k moles of ethylene oxide (wherein k has a value of from about 4 to about 40, inclusive of whole and fractional numbers) per mole of any of the following hydrophobes including mixtures thereof: n-undecyl alcohol, myristyl alcohol, lauryl alcohol, trimethyl nonanol, tridecyl alcohol, pentadecyl alcohol, cetyl alcohol, oleyl alcohol, stearyl alcohol, nonylphenol, dodecylphenol, tetradecylphenol, and the like.

Other illustrative water soluble organic surfactants which can be present as a component of the solution compositions are the liquid, anionic organic surfactants having at least one carbon-bonded sulfonic acid group, —$SO_3H$, or an ammonium, quaternary ammonium, alkali metal or alkaline earth metal derivative of said sulfonic acid group. The sulfonic acid groups or salt derivatives thereof can be substituents on a wide variety of "backbone" organic compounds which provide the hydrophobic portion of the emulsifier. The hydrophobic portion may consist of carbon and hydrogen as in sulfonated hydrocarbons (or salt derivatives thereof) having from 10 to 25 or more carbon atoms such as alkanes, high (e.g., $C_{10}$–$C_{15}$)alkyl-substituted benzenes, and liquid petroleum fractions, as typically illustrated by sodium tetradecyl sulfonate, sodium dodecylbenzene sulfonate and sodium and potassium salts of sulfonated mineral oil. The —$SO_3H$ group or salt derivative thereof may also be a substituent on an organic backbone consisting of carbon, hydrogen and oxygen wherein oxygen is present in an ether linkage as in polyoxyalkylene groups or in a carboxylic acid ester group. Typical of such compounds are those obtained by sulfating or sulfonating oxyalkylated fatty acid esters wherein the oxyalkylation is usually effected with ethylene oxide, propylene oxide or a combination thereof. Other examples of suitable organic surfactants for use in combination with the silicon-containing foam stabilizers described in the present invention are: the products obtained by reaction of amines such as diethylamine with long chain fatty acids such as oleic acid or with sulfonated $C_{10}$–$C_{15}$ alkylated aromatic hydrocarbons; taurine compounds having at least one long chain hydrocarbyl group bonded to nitrogen; and the like.

The solution compositions may also contain, as a third type of organic component, a glycol of from 2 to about 10 carbon atoms, or low molecular weight polyethylene glycols such as, for example, CARBOWAX 400 which is a polyethylene glycol having a formula molecular weight range of 380–420. Especially suitable is hexylene glycol (2-methyl-2,4-pentanediol).

When both the organic surfactant and glycol components are present in the solution compositions, the combined concentration thereof ranges from about 5 to about 90 parts by weight per 100 parts by weight of the organosiloxane composition contained therein. When only one of these components is present, the concentration thereof is also within this latter range.

When the aforesaid solution compositions are combined with water and amine catalyst such as the catalysts described hereinbelow, clear homogeneous aqueous solutions are obtained which can be added directly to the foam-producing reaction mixture. From the standpoint of retaining these desirable characteristics of clarity and homogeneity under otherwise adverse ambient temperatures which may be encountered upon standing, storage or shipment prior to use in the foam-producing reaction, the preferred aqueous premixtures are those containing both the organic surfactant and the glycol, in addition to the organic acidic component. It is to be understood that the solution compositions are also useful when added directly to the final foam-producing reaction mixture rather than being premixed with water and amine catalyst.

The solution compositions of the foam stabilizer as well as the aqueous premixtures, can contain minor amounts of other ingredients without departing from the scope of this invention. Such components include inhibitors such as for example, d-tartaric acid, tertiary-butyl pyrocatechol and di-tert-butyl-p-cresol ("Ionol"), which reduce any tendency of the foamed product to oxidative or hydrolytic instability. Further, when the foam stabilizers described in the present invention and/or the amine catalyst are employed as respective solutions, water soluble carrier solvents and components thereof are, of course, introduced into the aqueous premixtures without, however, any deleterious affect on the effectiveness or homogeneity of the aqueous premixtures.

The relative proportions of the organosiloxane composition, the amine catalysts and water in any particular solution are largely dependent upon and determined by the relative proportions of such ingredients which are desired in a particular foam-producing reaction mixture. Accordingly, in the preparation of a particular aqueous premixture, the relative proportions of the foam stabilizer, amine catalyst and water are adjusted and the aqueous premixture is added to the final foam-producing formulation in an amount sufficient to satisfy the respective functions of such components and to provide a foamed product of desired quality.

The polyester polyols employed in producing low density flexible polyester polyurethane foam in accordance with the process of this invention are the reaction products of polyfunctional organic carboxylic acids and polyhydric alcohols. The polyester polyols contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters can have hydroxyl numbers from about 30 to about 150, and preferably have hydroxyl numbers between about 45 and about 65. As is well known to this art, the hydroxyl numbers are determined by, and are defined as, the number of milligrams of potassium hydroxide required for the complete neutralization of the hydrolysis product of the fully acetylated derivative prepared from 1 gram of polyol or mixture of polyols. The hydroxyl number is also defined by the following equation which indicates its relationship with the molecular weight and functionality of the polyol:

$$OH = \frac{56.1 \times 1000 \times f}{M.W.}$$

wherein
OH=hydroxyl number of the polyol.
f=average functionality, that is, the average number of hydroxyl groups per molecule of polyol, and
M.W.=average molecular weight of the polyol.

Typical of the polyfunctional organic carboxylic acids that can be employed in producing polyester polyols useful in preparing the foams of this invention are: dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols.

The polyhydric alcohols (organic polyols) that can be employed in producing the polyester polyol starting material used in the process of this invention include the monomeric polyhydric alcohols such as, for example, glycerol; 1,2,6-hexanetriol; ethylene glycol; diethylene glycol; trimethylol propane; trimethylolethane; pentaerythritol; propylene glycol; 1,2-, 1,3- and 1,4-butylene glycols; 1,5-pentanediol; sorbitol; and the like, including mixtures thereof.

Other polyhydric alcohols that can be employed in producing the polyester polyols useful in preparing the foams of this invention are the polymeric polyhydric alcohols which include the linear and branched chain polyethers having a plurality of acyclic ether oxygens and at least two alcoholic hydroxyl radicals. Illustrative of such polyether polyols are the poly(oxyalkylene) polyols containing one or more chains of connected oxyalkylene radicals which are prepared by the reaction of one or more alkylene oxides which acyclic and alicyclic polyols. Examples of the poly(oxyalkylene) polyols include the poly(oxyethylene) glycols prepared by the addition of ethylene oxide to water, ethylene glycol or diethylene glycol; poly(oxypropylene) glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the poly(oxybutylene) glycols and copolymers such as poly(oxyethyleneoxybutylene) glycols and poly(oxypropylene-oxybutylene) glycols. Included in the term "poly(oxybutylene) glycols" are polymers of 1,2-butyleneoxide and 2,3-butyleneoxide.

Illustrative of further polyester polyol reactants that are useful in producing flexible polyester urethane foam in accordance with the process of this invention are the reaction products of any of the aforesaid polycarboxylic acids and the polyhydric alcohols prepared by the reaction of one or more alkylene oxides such as ethylene oxide, propylene oxide, butylene oxide and mixtures thereof, with any of the following: glycerol; trimethylolpropane; 1,2,6-hexanetriol; pentaerythritol; [sorbitol; glycosides such as methyl, ethyl, propyl, butyl and 2-ethylhexyl arabinoside, xyloside, fructoside, glucoside, and rhammoside; sucrose; mononuclear polyhydroxybenzenes such as resorcinol, pyrogallol, phloroglucinol, hydroquinone, 4,6-ditertiarybutylcatechol, and catechol; polynuclear hydroxybenzenes ("polynuclear" designating at least two benzene nuclei) such as the di-, tri- and tetra-phenylol compounds in which two to four hydroxybenzene groups are attached either directly by means of single bonds or through an aliphatic hydrocarbon radical containing one to twelve carbon atoms, such compounds being typically illustrated by 2,2-bis(p-hydroxyphenyl)propane, bis(p-hydroxyphenol)-methane and the various diphenols and diphenol methanes disclosed in U.S. Pat. Nos. 2,506,486 and 2,744,882, respectively. Another type of polyester polyol reactant is that produced by reaction of a polycarboxylic acid and the polyether adducts formed by reaction of ethylene oxide, propylene oxide or butylene oxide with phenol-formaldehyde condensation products such as the novolaks.]

The organic polyisocyanates that are useful in producing low density flexible polyester polyurethane foam in accordance with the process of this invention are organic compounds that contain at least two isocyanato groups. Such compounds are well known in the art of producing polyurethane foams, and are conveniently represented by the general formula:

$$Q'(NCO)_i$$

wherein: i has an average value of at least two and is usually no more than six, and Q' represents an aliphatic, cycloaliphatic or aromatic radical which can be an unsubstituted hydrocarbyl group or a hydrocarbyl group substituted, for example, with halogen or alkoxy. For example, Q' can be an alkylene, cycloalkylene, arylene, alkyl-substituted cycloalkylene, alkarylene or aralkylene radical including corresponding halogen- and alkoxy-substituted radicals. Typical examples of polyisocyanates for use in preparing the polyurethanes of this invention are any of the following including mixtures thereof: 1,6-hexamethylene diisocyanate; 1,4-tetramethylene diisocyanate; 1-methyl-2,4-diisocyanatocyclohexane; bis(4-isocyanatophenyl)methane; 4-methoxy-1,4-phenylenediisocyanate; 4-chloro-1,3-phenylenediisocyanate; 4-bromo-1,3-phenylenediisocyanate; 5,6-dimethyl-1,3-phenylenediisocyanate; 2,4-tolylene diisocyanate; 2,6-tolylene diisocyanate; mixtures of the 2,4- and 2,6-tolylene diisocyanates; crude tolylene diisocyanates; 6-isopropyl-1,3-phenylenediisocyanate; durylene diisocyanate; triphenylmethane-4,4',4"-triisocyanate; and other organic polyisocyanates known to the polyurethane art. Other suitable polyisocyanate reactants are ethylphosphonic diisocyanate and phenylphosphonic diisocyanate. Of the aforesaid types of polyisocyanates, those containing aromatic nuclei are generally preferred.

Also useful as the polyisocyanate reactant are polymeric isocyanates having units of the formula:

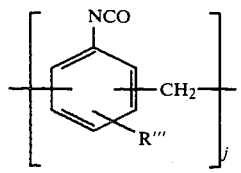

wherein R''' is hydrogen and/or lower alkyl and j has an average value of at least 2.1. Preferably the lower alkyl radical is methyl and j has an average value of from 2.1 to about 3.2. Particularly useful polyisocyanates of this type are the polyphenylmethylene polyisocyanates produced by phosgenation of the polyamine obtained by acid-catalyzed condensation of aniline with formaldehyde. Polyphenylmethylene polyisocyanates of this type are available commercially under such trade names as PAPI, NIAX Isocyanate AFPI, Mondur MR, Isonate 390P, NCO-120, Thanate P220, NCO-10 and NCO-20. These products are low viscosity (50–100 centipoises at 25° C.) liquids having average isocyanato functionalities between about 2.25 and about 3.2 or higher, depending upon the specific aniline-to-formaldehyde molar ratio used in the polyamine preparation.

Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates and/or polymeric tolylene diisocyanates obtained as residues from the manufacture of the diisocyanates.

On a combined basis, the polyester polyol and organic polyisocyanate usually constitute the major proportion by weight of the polyurethane-forming reaction mixture. In general, the polyisocyanate and polyester polyol reactants are employed in relative amounts such that the ratio of total —NCO equivalents to total active hydrogen equivalent (of the polyester polyol and any water, when used) is from 0.8 to 1.5, preferably from 1.0 to 1.25, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is preferably within the range from about 100 to about 125.

The urethane-forming reaction is effected in the presence of a minor amount of a catalyst, usually a tertiary amine. Suitable amine catalysts include, but are not limited to, one or more of the following: N-methylmorpholine; N-ethylmorpholine; N-octadecylmorpholine; triethylamine; tributylamine; trioctylamine; N,N,N',N'-tetramethylethylenediamine, N,N,N',N'-tetramethyl-1,3-butanediamine; triethanolamine; N,N-dimethylethanolamine; triisopropanolamine; N-methyldiethanolamine; hexadecyldimethylamine; N,N-dimethylbenzylamine; trimethylamine; N,N-dimethyl-2-(2-dimethylaminoethoxy)ethylamine, also known as bis(2-dimethylaminoethyl)ether; triethylenediamine (i.e. 1,4-diazabicyclo[2.2.2]octane); the formate and other salts of triethylenediamine, oxyalkylene adducts of the amino groups of primary and secondary amines and other such amine catalysts which are well known in the art of polyurethane manufacture. Also useful are the betatertiaryamino nitriles wherein the 2-cyanoalkyl group is bonded to acyclic tertiary amino nitrogen or to nitrogen of a morpholine or piperazine nucleus. Such catalysts are described in U.S. Pat. No. 3,925,268 and are exemplified by 3-(N,N-dimethylamino)propionitrile as such or in combination with other tertiary amines such as bis[2-(N,N-dimethylamino)ethyl]ether. Other useful amine catalysts are set forth in U.S. Pat. No. 3,821,131. Although metal-containing catalysts such as stannous octoate are usually employed in the preparation of flexible polyether polyurethane foam, such metal catalysts are not preferred in the manufacture of flexible polyester polyurethane foam.

It is to be understood that the aforesaid amines may be used as essentially the sole amine catalyst of the reaction mixtures employed in this invention or any combination of two or more such amines may be employed. The amine catalyst may also be introduced into the reaction mixture in the form of a solvent solution containing from about 10 to about 80 weight percent of total active catalyst. Suitable carrier solvents of amine catalysts include water-soluble glycols such as diethylene glycol; dipropylene glycol; and 2-methyl-2,4-pentanediol("hexylene glycol").

It is to be understood that any of the aforesaid amine catalysts or solutions thereof can be added directly to the foam-producing reaction mixture or they can be added in premixed form with water and the foam stabilizers described in this invention. In the latter event, the catalyst is preferably added as a component of the homogeneous aqueous premixtures described hereinabove.

The amine catalyst may, in general, be present in the final foam producting reaction mixture in an amount of from about 0.2 to about 8 parts by weight of active catalyst (that is, the amine exclusive of other components present in solutions thereof) per 100 parts by weight of the polyester polyol reactant.

Foaming can be accomplished by employing a minor amount of a polyurethane blowing agent such as water, in the reaction mixture, the reaction of water and isocyanate generating carbon dioxide blowing agent, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluoroinated and may also be otherwise halogenated. Fluorocarbon blowing agents suitable for use in foaming the formulations of this invention include trichloromonofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. Another useful class of blowing agents include thermally-unstable compounds which liberate gases upon heating, such as N,N'-dimethyl-N,N'-dinitrosoterephthalamide, and the like. The generally preferred method of foaming for producing low density flexible polyester polyurethane foams is the use of water or a combination of water plus a fluorocarbon blowing agent such as trichloromonofluoromethane.

The amount of blowing agent employed in the foaming reaction will vary with factors such as the density that is desired in the foamed product. Usually, however, from about 1 to about 30 parts by weight of the blowing agent per 100 parts by weight of the polyester polyol starting material is preferred.

Other additional ingredients can be employed in minor amounts in producing the low density flexible polyester polyurethane foams in accordance with the process of this invention, if desired, for specific purposes. Thus, flame retardants [e.g., tris(2-chloroethyl)phosphate] can be used to reduce any tendency of the polyurethane foam to flammability. Illustrative of other such additives that can be employed are: compression set additives (e.g., hexylene glycol); additives to regulate cell structure so as to coarsen cells and thereby reduce the tendency of the foam to split (e.g., paraffin oil); fillers; dyes; pigments; anti-discoloration additives including anti-scorch, and anti-oxidation agents; and the like.

The process described herein for the production of low density flexible polyester polyurethane foam is usually carried out as a "one-shot" process in which the polyester polyol and polyisocyanate reactants are independently added to the foam-producing reaction mixture. The foaming and urethane-forming reactions occur without the application of external heat. Often the resulting foam is cured by heating the foam at a temperature between about 100° C. and about 150° C. for about 10 to about 60 minutes to eliminate any surface tackiness, as desired. It is to be understood that variations in process conditions and manipulative steps can be used as known in the art. For example, the various ingredients of the reaction mixture can be combined and the foaming reaction mixture poured into a mold, or the various ingredients can be combined and the foaming reaction mixture commenced and completed in a mold.

The relative amounts of the various components reacted in accordance with the above-described process for producing low density flexible polyester polyurethane foams are not narrowly critical. The polyester polyol and polyisocyanate are present in the foam-producing formulation in a major amount. The relative amounts of these two components is the amount required to produce the urethane structure of the foam and such relative amounts are well known in the art. The source of the blowing action such as water, auxiliary blowing agents, amine catalyst and the organosiloxane composition foam stabilizers are each present in a minor amount necessary to achieve the function of the component. Thus, the blowing agent is present in a minor amount sufficient to foam the reaction mixture, the amine catalyst is present in a catalytic amount (i.e., an amount sufficient to catalyze the reaction to produce the urethane at a reasonable rate), and the organosiloxane compositions are present in a foam-stabilizing amount, that is, in an amount sufficient to stabilize the foam. The preferred amounts of these various components are as given hereinabove.

The low density flexible polyester urethane foams produced in accordance with this invention can be used in the same areas as conventional flexible polyester polyurethane foams. For example, they can be used as textile interliners, cushioning materials for seating, for packaging of delicate objects, and as gasketing materials.

The following examples are merely illustrative of the present invention and are not intended as a limitation upon the scope thereof. Unless otherwise indicated, all parts are by weight.

Molecular weights given in the examples for various organosiloxane compositions were measured by Gel Permeation Chromatography (abbreviated in the examples as "GPC") using a calibration curve showing the relationship between the respective elution volumes established for dimethylsiloxane fluids of different molecular weights and the respective known molecular weights of such fluids. In establishing the calibration curve, the various dimethylsiloxane fluids were in solution in trichloroethylene solvent using styragel packed columns. In measuring the molecular weights of the organosiloxane compositions described herein, the elution volume observed for any particular organosiloxane composition (in trichloroethylene solvent) was equated with the corresponding elution volume of the calibration curve, and the molecular weight associated with that particular elution volume was assigned as the molecular weight of the organosiloxane composition. Gel Permeation Chromatography as a technique for measuring molecular weight is discussed in "Polymer Fractionation" (ed. Manfred J. R. Cantow, Academic Press, Inc. New York 1967), pages 123–173, Chapter B4, entitled "Gel Permeation Chromatography," by K. H. Altgelt and J. C. Moore. In determining the molecular weights given in the examples, the particular procedure employed was that described in the article entitled "Characterization of Silicones by Gel Permeation Chromatography" by F. Rodriguez et al. in I & EC Product and Development, Vol. 5, No. 2, page 121 (June 1966) using five styragel packed columns (Waters Associates, Inc.) having a pore size of $10^3 A$, $3 \times 10^3 A$, $10^4 A$, $3 \times 10^4 A$, and $8 \times 10^3 A$, respectively. The organosiloxane composition molecular weight range of from about 400 to about 1500 as claimed in the instant invention is based upon this particular procedure.

Definitions

As used in the Examples appearing hereinafter, the following designations, terms and abbreviations have the indicated meanings:

| | |
|---|---|
| ml | milliliter |
| °C. | degree centigrade |
| °F. | degree Fahrenheit |
| cstk | centistoke |
| pcf | pounds per cubic foot |
| Me | methyl |
| SCFM | standard cubic feet per minute |
| G.P.C. | Gel Permeation Chromatography |
| percent | weight percent |
| Cream Time (seconds) | The time in seconds which it takes for the foam-forming mixture to go from a homogeneous clear liquid to a heterogeneous milky liquid. |
| Rise Time (seconds) | The time in seconds which it takes the foam to reach its maximum height. |
| Cells Per Inch | The number of cells per linear inch of the foam, the number being directly proportional to the fineness of the cell structure. |
| Density | The density of the foam in pounds per cubic foot. |
| Breathability | The porosity of a foam, being roughly proportional to the number of open cells in a foam and being measured in accordance with the NOPCO breathability test procedure described by R. E. Jones and G. Fesman, Journal of Cellular Plastics, January, 1965. This is a measure of the air flow through a 2-inch by 2-inch by 1-inch foam sample, expressed as standard cubic feet per minute. |
| ILD | ASTM D1564-69 |
| Compression Set | ASTM D1564-69 |
| Tensile Strength | ASTM D1564-69 |
| Elongation | ASTM D1564-69 |
| Tear resistance | ASTM D1564-69 |

Starting Materials

In the following examples, the starting material described below were used:

Polyester Polyol

A commercially available polyester res. produced from adipic acid, diethylene glycol and trimethyl propane in a mole ratio of approximately 1:1:0.2. This polyester has a hydroxyl number of about 50 to 56, a molecular weight of about 2,000, an acid number not greater than 2 and a viscosity of about 17,000 centistokes at about 25° C. This particular polyester is sold under the name "Witco Fomrez Number 50".

Tolylene Diisocyanate (Index 105)

A mixture of about 80 weight percent 2,4-tolylene diisocyanate and about 20 weight percent 2,6-tolylene diisocyanate. Index 105 means that the amount of mixture employed was 105 percent of the stoichiometric amount required to react with the polyester polyol and water present in the foam formulation.

Catalyst

A mixture of about 95 percent by weight 3-dimethylaminopropionitrile and about 5 percent by weight bis(2-dimethylaminoethyl) ether.

Organosiloxane Composition Surfactant

Organosiloxane Compositions A through O used in this invention and comparative Organosiloxane Compositions PP through WW outside the scope of this invention are described in the Examples hereinbelow.

Flame Retardant

Tris(2-chloroethyl) phosphate available from Stauffer Chemical Company and identified as "CEF".

Chloroplatinic Acid Solution

A solution consisting of 4.4 percent by weight of chloroplatinic acid hexahydrate dissolved in 95.6 percent by weight of a solvent consisting of 99.0 percent by weight of 1,2-dimethoxyethane and 1.0 percent by weight of isopropanol. This solution was used in an amount that provided 200 parts by weight of platinum per million parts by weight of the total reaction mixture.

EXAMPLE I

PREPARATION OF ORGANOSILOXANE COMPOSITION

Into a 500 ml four-necked reaction flask equipped with a mechanical stirrer, thermometer, condenser and nitrogen blow-by was added 56.7 grams (0.35 mole) of hexamethyldisiloxane ($Me_3SiOSiMe_3$), 38.85 grams (0.525 mole) of cyclic dimethylsiloxane tetramer ($Me_2SiO)_4$ and 44.45 grams (0.35 mole) of poly[cyanopropyl(methyl)siloxane][$NCC_3H_6(Me)SiO$]. Also added to the reaction flask was about 2.8 grams (0.029 mole) of sulfuric acid ($H_2SO_4$) catalyst corresponding to about 2.0 weight percent of the total weight of the mixture. The mixture was heated to 40° C. and stirred for four hours resulting in an equilibrated liquid product. After the equilibration reaction was complete, the reaction flask was cooled to room temperature. The equilibrated liquid product so produced was neutralized with excess sodium bicarbonate ($NaHCO_3$) and filtered through a pressure filter containing an average filter size of 0.10 microns. The equilibrated liquid product is an organosiloxane composition having a viscosity of 6.0 cstk at a temperature of 25° C. The organosiloxane composition is a clear amber liquid having an average molecular weight (G.P.C.) of 400 and a calculated molecular weight of 400. The organosiloxane composition has the average formula,

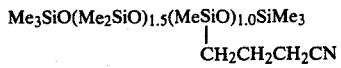

and is hereinafter referred to as Organosiloxane Composition

A. The composition and properties of Organosiloxane Composition A and Organosiloxane Compositions B through H described hereinafter are tabulated in Table A below.

EXAMPLE II

PREPARATION OF ORGANOSILOXANE COMPOSITION

Into a 500 ml four-necked reaction flask equipped with a mechanical stirrer, thermometer, condenser and nitrogen blow-by was added 64.8 grams (0.40 mole) of hexamethyldisiloxane ($Me_3SiOSiMe_3$), 56.0 grams (0.757 mole) of cyclic dimethylsiloxane tetramer ($Me_2SiO)_4$ and 60.8 grams (0.479 mole) of poly[cyanopropyl(methyl)siloxane][$NCC_3H_6(Me)SiO$]. Also added to the reaction flask was about 3.0 grams (0.03 mole) of sulfuric acid ($H_2SO_4$) catalyst corresponding to about 2.0 weight percent of the total weight of the mixture. The mixture was heated to 40° C. and stirred for four hours resulting in an equilibrated liquid product. After the equilibration reaction was complete, the reaction flask was cooled to room temperature. The equilibrated liquid product so produced was neutralized with excess sodium bicarbonate ($NaHCO_3$) and filtered through a pressure filter containing an average filter size of 0.10 microns. The equilibrated liquid product is an organosiloxane composition having a viscosity of 6.4 cstk at a temperature of 25° C. The organosiloxane composition is a clear amber liquid having an average molecular weight (G.P.C.) of 450 and a calculated molecular weight of 450. The organosiloxane composition has the average formula, $$Me_3SiO(Me_2SiO)_{1.9}(MeSiO)_{1.2}SiMe_3$$
$$|$$
$$CH_2CH_2CH_2CN$$

and is hereinafter referred to as Organosiloxane Composition B.

EXAMPLE III

PREPARATION OF ORGANOSILOXANE COMPOSITION

Into a 500 ml four-necked reaction flask equipped with a mechanical stirrer, thermometer, condenser and nitrogen blow-by was added 32.4 grams (0.20 mole) of hexamethyldisiloxane ($Me_3SiOSiMe_3$), 35.6 grams (0.481 mole) of cyclic dimethylsiloxane tetramer ($Me_2SiO)_4$ and 38.1 grams (0.299 mole) of poly[cyanopropyl(methyl)siloxane][$NCC_3H_6(Me)SiO$]. Also added to the reaction flask was about 2.12 grams (0.022 mole) of sulfuric acid ($H_2SO_4$) catalyst corresponding to about 2.0 weight percent of the total weight of the mixture. The mixture was heated to 40° C. and stirred for four hours resulting in an equilibrated liquid product. After the equilibration reaction was complete, the reaction flask was cooled to room temperature. The equilibrated liquid product so produced was neutralized with excess sodium bicarbonate ($NaHCO_3$) and filtered through a pressure filter containing an average filter size of 0.10 microns. The equilibrated liquid product is an organosiloxane composition having a viscosity of 9.12 cstk at a temperature of 25° C. The organosiloxane composition is a clear amber liquid having an average molecular weight (G.P.C.) of 500 and a calculated molecular weight of 518. The organosiloxane composition has the average formula,

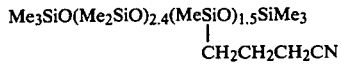

and is hereinafter referred to as Organosiloxane Composition C.

EXAMPLE IV

PREPARATION OF ORGANOSILOXANE COMPOSITION

Into a 500 ml four-necked reaction flask equipped with a mechanical stirrer, thermometer, condenser and nitrogen blow-by was added 56.7 grams (0.35 mole) of hexamethyldisiloxane ($Me_3SiOSiMe_3$), 77.7 grams (1.05 mole) of cyclic dimethylsiloxane tetramer ($Me_2SiO)_4$ and 37.8 grams (0.298 mole) of poly[cyanopropyl(methyl)siloxane][$NCC_3H_6(Me)SiO$]. Also added to the reaction flask was about 4.0 grams (0.031 mole) of sulfuric acid ($H_2SO_4$) catalyst corresponding to about 2.0 weight percent of the total weight of the mixture. The mixture was heated to 40° C. and stirred for four hours resulting in an equilibrated liquid product. After the equilibration reaction was complete, the reaction flask was cooled to room temperature. The equilibrated liquid product so produced was neutralized with excess sodium bicarbonate ($NaHCO_3$) and filtered through a pressure filter containing an average filter size of 0.10 microns. The equilibrated liquid product is an organosiloxane composition having a viscosity of 5.3 cstk at a temperature of 25° C. The organosiloxane composition is a clear amber liquid having an average molecular weight (G.P.C.) of 480 and a calculated molecular weight of 492. The organosiloxane composition has the average formula,

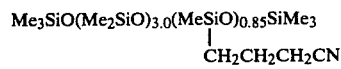

and is hereinafter referred to as Organosiloxane Composition D.

EXAMPLE V

PART A: PREPARATION OF HYDROSILOXANE FLUID

Into a 500 ml four-necked reaction flask equipped with a mechanical stirrer, thermometer, condenser and nitrogen blow-by was added 51.84 grams (0.32 mole) of hexamethyldisiloxane ($Me_3SiOSiMe_3$), 40.23 grams (0.544 mole) of cyclic dimethylsiloxane tetramer ($Me_2SiO)_4$ and 19.2 grams (0.32 mole) of poly(methylhydrogensiloxane) (MeHSiO). Also added to the reaction flask was about 2.7 grams (0.028 mole) of sulfuric acid ($H_2SO_4$) catalyst corresponding to about 2.0 weight percent of the total weight of the mixture. The mixture was stirred vigorously at room temperature while the sulfuric acid catalyst was added to the reaction flask. The mixture was then heated to 40° C. and vigorously stirred for four hours resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.02 microns. The equilibrated liquid product, now properly designated a hydrosiloxane fluid, is a clear liquid having a calculated molecular weight of 348. The hydrosiloxane fluid has the average formula,

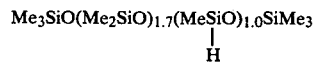

and is hereinafter referred to as Hydrosiloxane Fluid I.

PART B: PREPARATION OF ORGANOSILOXANE COMPOSITION

Into a 500 ml four-necked reaction flask equipped with a mechanical stirrer, thermometer, condenser and nitrogen blow-by was added 138.8 grams (0.40 mole) of Hydrosiloxane Fluid I. The Hydrosiloxane Fluid I was then heated to 85° C. with constant stirring and chloroplatinic acid solution was added to the reaction flask. To the reaction flask was also added dropwise 53.28 grams (0.48 mole) of allyloxypropionitrile (CH$_2$=CHCH$_2$OCH$_2$CH$_2$CN). The reaction exothermed to 125° C. and after cooling to 110° C., the mixture was kept at that temperature for 20 minutes resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.10 microns. The equilibrated liquid product is an organosiloxane composition having a viscosity of 8.54 cstk at a temperature of 25° C. The organosiloxane composition is a clear amber liquid having an average molecular weight (G.P.C.) of 450 and a calculated molecular weight of 459. The organosiloxane composition has the average formula,

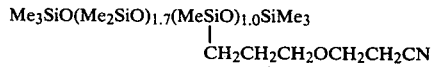

and is hereinafter referred to as Organosiloxane Composition E.

EXAMPLE VI

PART A: PREPARATION OF HYDROSILOXANE FLUID

Into a 500 ml four-necked reaction flask equipped with a mechanical stirrer, thermometer, condenser and nitrogen blow-by was added 56.7 grams (0.35 mole) of hexamethyldisiloxane (Me$_3$SiOSiMe$_3$), 64.7 grams (0.875 mole) of cyclic dimethylsiloxane tetramer (Me$_2$SiO)$_4$ and 31.5 grams (0.525 mole) of poly(methylhydrogensiloxane) (MeHSiO). Also added to the reaction flask was about 3.05 grams (0.031 mole) of sulfuric acid (H$_2$SO$_4$) catalyst corresponding to about 2.0 weight percent of the total weight of the mixture. The mixture was stirred vigorously at room temperature while the sulfuric acid catalyst was added to the reaction flask. The mixture was then heated to 40° C. and vigorously stirred for four hours resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.02 microns. The equilibrated liquid product, now properly designated a hydrosiloxane fluid, is a clear liquid having a calculated molecular weight of 437. The The hydrosiloxane fluid has the average formula,

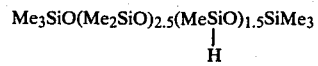

and is hereinafter referred to as Hydrosiloxane Fluid II.

PART B: PREPARATION OF ORGANOSILOXANE COMPOSITION

Into a 500 ml four-necked reaction flask equipped with a mechanical stirrer, thermometer, condenser and nitrogen blow-by was added 87.4 grams (0.20 mole) of Hydrosiloxane Fluid II. The Hydrosiloxane Fluid II was then heated to 85° C. with constant stirring and chloroplatinic acid solution was added to the reaction flask. To the reaction flask was also added dropwise 40.63 grams (0.366 mole) of allyloxypropionitrile (CH$_2$=CHCH$_2$OCH$_2$CH$_2$CN). The reaction exothermed to 125° C. and after cooling to 110° C., the mixture was kept at that temperature for 20 minutes resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.10 microns. The equilibrated liquid product is an organosiloxane composition having a viscosity of 11.3 cstk at a temperature of 25° C. The organosiloxane composition is a clear amber liquid having an average molecular weight (G.P.C.) of 600 and a calculated molecular weight of 600. The organosiloxane composition has the average formula,

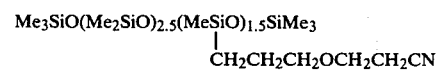

and is hereinafter referred to as Organosiloxane Composition F.

EXAMPLE VII

PART A: PREPARATION OF HYDROSILOXANE FLUID

Into a 500 ml four-necked reaction flask equipped with a mechanical stirrer, thermometer, condenser and nitrogen blow-by was added 37.2 grams (0.23 mole) of hexamethyldisiloxane (Me$_3$SiOSiMe$_3$), 51.06 grams (0.69 mole) of cyclic dimethylsiloxane tetramer (Me$_2$SiO)$_4$ and 13.8 grams (0.23 mole) of poly(methylhydrogensiloxane) (MeHSiO). Also added to the reaction flask was about 2.04 grams (0.021 mole) of sulfuric acid (H$_2$SO$_4$) catalyst corresponding to about 2.0 weight percent of the total weight of the mixture. The mixture was stirred vigorously at room temperature while the sulfuric acid catalyst was added to the reaction flask. The mixture was then heated to 40° C. and vigorously stirred for four hours resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.02 microns. The equilibrated liquid product, now properly designated a hydrosiloxane fluid, is a clear liquid having a calculated molecular weight of 444. The hydrosiloxane fluid has the average formula,

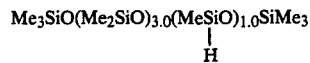

and is hereinafter referred to as Hydrosiloxane Fluid III.

PART B: PREPARATION OF ORGANOSILOXANE COMPOSITION

Into a 500 ml four-necked reaction flask equipped with a mechanical stirrer, thermometer, condenser and nitrogen blow-by was added 155.4 grams (0.35 mole) of Hydrosiloxane Fluid III. The Hydrosiloxane Fluid III was then heated to 85° C. with constant stirring and chloroplatinic acid solution was added to the reaction flask. To the reaction flask was also added dropwise 47.39 grams (0.43 mole) of allyloxypropionitrile (CH$_2$=CHCH$_2$OCH$_2$CH$_2$CN). The reaction exothermed to 125° C. and after cooling to 110° C., the mixture was kept at that temperature for 20 minutes resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.10 microns. The equilibrated liquid product is an organosiloxane composition having a viscosity of 9.53 cstk at a temperature of 25° C. The organosiloxane composition is a clear amber liquid having an average molecular weight (G.P.C.) of 550 and a calculated molecular weight of 555. The organosiloxane composition has the average formula,

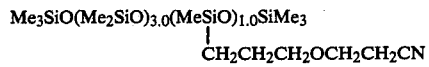

and is hereinafter referred to as Organosiloxane Composition G.

EXAMPLE VIII

PART A: PREPARATION OF HYDROSILOXANE FLUID

Into a 500 ml four-necked reaction flask equipped with a mechanical stirrer, thermometer, condenser and nitrogen blow-by was added 40.5 grams (0.25 mole) of hexamethyldisiloxane (Me$_3$SiOSiMe$_3$), 111.0 grams (1.50 mole) of cyclic dimethylsiloxane tetramer (Me$_2$SiO)$_4$ and 52.5 grams (0.875 mole) of poly(methylhydrogensiloxane) (MeHSiO). Also added to the reaction flask was about 4.08 grams (0.042 mole) of sulfuric acid (H$_2$SO$_4$) catalyst corresponding to about 2.0 weight percent of the total weight of the mixture. The mixture was stirred vigorously at room temperature while the sulfuric acid catalyst was added to the reaction flask. The mixture was then heated to 40° C. and vigorously stirred for four hours resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.02 microns. The equilibrated liquid product, now properly designated a hydrosiloxane fluid, is a clear liquid having a calculated molecular weight of 816. The hydrosiloxane fluid has the average formula,

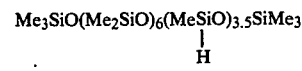

and is hereinafter referred to as Hydrosiloxane Fluid IV.

PART B: PREPARATION OF ORGANOSILOXANE COMPOSITION

Into a 500 ml four-necked reaction flask equipped with a mechanical stirrer, thermometer, condenser and nitrogen blow-by was added 122.4 grams (0.15 mole) of Hydrosiloxane Fluid IV. The Hydrosiloxane Fluid IV was then heated to 85° C. with constant stirring and chloroplatinic acid solution was added to the reaction flask. To the reaction flask was also added dropwise 71.09 grams (0.64 mole) of allyloxypropionitrile (CH$_2$=CHCH$_2$OCH$_2$CH$_2$CN). The reaction exothermed to 125° C. and after cooling to 110° C., the mixture was kept at that temperature for 20 minutes resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.10 microns.

The equilibrated liquid product is an organosiloxane composition having a viscosity of 22.5 cstk at a temperature of 25° C. The organosiloxane composition is a clear amber liquid having an average molecular weight (G.P.C.) of 1200 and a calculated molecular weight of 1205. The organosiloxane composition has the average formula,

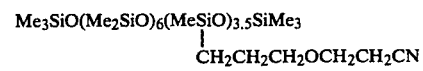

and is hereinafter referred to as Organosiloxane Composition H.

EXAMPLE IX

PART A: PREPARATION OF HYDROSILOXANE FLUID

Into a 500 ml four-necked reaction flask equipped with a mechanical stirrer, thermometer, condenser and nitrogen blow-by was added 81.0 grams (0.50 mole) of hexamethyldisiloxane (Me$_3$SiOSiMe$_3$), 63.0 grams (0.851 mole) of cyclic dimethylsiloxane tetramer (Me$_2$SiO)$_4$ and 30.0 grams (0.50 mole) of poly(methylhydrogensiloxane) (MeHSiO). Also added to the reaction flask was about 3.5 grams (0.036 mole) of sulfuric acid (H$_2$SO$_4$) catalyst corresponding to about 2.0 weight percent of the total weight of the mixture. The mixture was stirred vigorously at room temperature while the sulfuric acid catalyst was added to the reaction flask. The mixture was then heated to 40° C. and vigorously stirred for four hours resulting in an equilibrated liquid product. After the equilibration reaction was complete, the reaction flask was cooled to room temperature. The equilibrated liquid product so produced was neutralized with excess sodium bicarbonate (NaHCO3) and filtered through a pressure filter containing an average filter size of 0.02 microns. The equilibrated liquid product, now properly designated a hydrosiloxane fluid, is a clear liquid having a calculated molecular weight of 348. The hydrosiloxane fluid has the average formula,

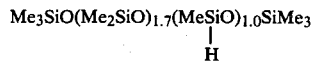
|
H and is hereinafter referred to as Hydrosiloxane Fluid V.

PART B: PREPARATION OF ORGANOSILOXANE COMPOSITION

Into a 500 ml four-necked reaction flask equipped with a mechanical stirrer, thermometer, condenser and nitrogen blow-by was added 93.96 grams (0.27 mole) of Hydrosiloxane Fluid V. The Hydrosiloxane Fluid V was then heated to 85° C. with constant stirring and chloroplatinic acid solution was added to the reaction flask. To the reaction flask was also added dropwise 66.1 grams (0.324 mole) of allylmethoxytriglycol [CH2=CHCH2(OC2H4)3OCH3]. The reaction exothermed to 125° C. and after cooling to 110° C., the mixture was kept at that temperature for 20 minutes resulting in an equilibrated liquid product. After the equilibration reaction was complete, the reaction flask was cooled to room temperature. The equilibrated liquid product so produced was neutralized with excess sodium bicarbonate (NaHCO3) and filtered through a pressure filter containing an average filter size of 0.10 microns. The equilibrated liquid product is an organosiloxane composition having a viscosity of 6.5 cstk at a temperature of 25° C. The organosiloxane composition is a clear amber liquid having an average molecular weight (G.P.C.) of 500 and a calculated molecular weight of 552. The organosiloxane composition has the average formula,

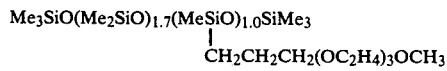

and is hereinafter referred to as Organosiloxane Composition I. The composition and properties of Organosiloxane Composition I and Organosiloxane Compositions J through M described hereinafter are tabulated in Table B below.

EXAMPLE X
PART A: PREPARATION OF HYDROSILOXANE FLUID

Into a 500 ml four-necked reaction flask equipped with a mechanical stirrer, thermometer, condenser and nitrogen blow-by was added 24.3 grams (0.15 mole) of hexamethyldisiloxane (Me3SiOSiMe3), 55.5 grams (0.75 mole) of cyclic dimethylsiloxane tetramer (Me2SiO)4 and 18.0 grams (0.30 mole) of poly(methylhydrogensiloxane) (MeHSiO). Also added to the reaction flask was about 1.96 grams (0.02 mole) of sulfuric acid (H2SO4) catalyst corresponding to about 2.0 weight percent of the total weight of the mixture. The mixture was stirred vigorously at room temperature while the sulfuric acid catalyst was added to the reaction flask. The mixture was then heated to 40° C. and vigorously stirred for four hours resuling in an equilibrated liquid product. After the equilibration reaction was complete, the reaction flask was cooled to room temperature. The equilibrated liquid product so produced was neutralized with excess sodium bicarbonate (NaHCO3) and filtered through a pressure filter containing an average filter size of 0.02 microns. The equilibrated liquid product, now properly designated a hydrosiloxane fluid, is a clear liquid having a calculated molecular weight of 652. The hydrosiloxane fluid has the average formula,

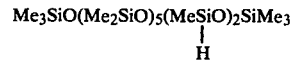
|
H and is hereinafter referred to as Hydrosiloxane Fluid VI.

PART B: PREPARATION OF ORGANOSILOXANE COMPOSITION

Into a 500 ml four-necked reaction flask equipped with a mechanical stirrer, thermometer, condenser and nitrogen blow-by was added 97.8 grams (0.15 mole) of Hydrosiloxane Fluid VI. The Hydrosiloxane Fluid VI was then heated to 85° C. with constant stirring and chloroplatinic acid solution was added to the reaction flask. To the reaction flask was also added dropwise 74.66 grams (0.366 mole) of allylmethoxytriglycol [CH2=CHCH2(OC2H4)3OCH3]. The reaction exothermed to 125° C. and after cooling to 110° C., the mixture was kept at that temperature for 20 minutes resulting in an equilibrated liquid product. After the equilibration reaction was complete, the reaction flask was cooled to room temperature. The equilibrated liquid product so produced was neutralized with excess sodium bicarbonate (NaHCO3) and filtered through a pressure filter containing an average filter size of 0.10 microns. The equilibrated liquid product is an organosiloxane composition having a viscosity of 14.3 cstk at a temperature of 25° C. The organosiloxane composition is a clear amber liquid having an average molecular weight (G.P.C.) of 1000 and a calculated molecular weight of 1060. The organosiloxane composition has the average formula,

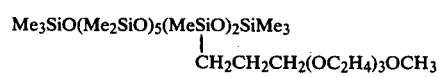

and is hereinafter referred to as Organosiloxane Composition J.

EXAMPLE XI
PART A: PREPARATION OF HYDROSILOXANE FLUID

Into a 500 ml four-necked reaction flask equipped with a mechanical stirrer, thermometer, condenser and nitrogen blow-by was added 64.8 grams (0.40 mole) of hexamethyldisiloxane (Me3SiOSiMe3), 44.4 grams (0.60 mole) of cyclic dimethylsiloxane tetramer (Me2SiO)4 and 24.4 grams (0.40 mole) of poly(methylhydrogensiloxane) (MeHSiO). Also added to the reaction flask was about 2.67 grams (0.027 mole) of sulfuric acid (H2SO4) catalyst corresponding to about 2.0 weight percent of the total weight of the mixture. The mixture was stirred vigorously at room temperature while the sulfuric acid catalyst was added to the reaction flask. The mixture was then heated to 40° C. and vigorously stirred for four hours resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.02 microns. The equilibrated liquid product, now properly designated a hydrosiloxane fluid, is a clear liquid having a calculated molecular weight of 333. The hydrosiloxane fluid has the average formula,

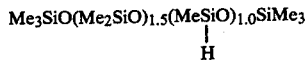

and is hereinafter referred to as Hydrosiloxane Fluid VII.

PART B: PREPARATION OF ORGANOSILOXANE COMPOSITION

Into a 500 ml four-necked reaction flask equipped with a mechanical stirrer, thermometer, condenser and nitrogen blow-by was added 76.5 grams (0.23 mole) of Hydrosiloxane Fluid VII. The Hydrosiloxane Fluid VII was then heated to 85° C. with constant stirring and chloroplatinic acid solution was added to the reaction flask. To the reaction flask was also added dropwise 53.03 grams (0.28 mole) of allylmethoxydipropyleneglycol $$[CH_2=CHCH_2(OCH_2\overset{\underset{\displaystyle CH_3}{|}}{CH})_2OCH_3].$$

The reaction exothermed to 125° C. and after cooling to 110° C., the mixture was kept at that temperature for 20 minutes resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.10 microns. The equilibrated liquid product is an organosiloxane composition having a viscosity of 4.52 cstk at a temperature of 25° C. The organosiloxane composition is a clear amber liquid having an average molecular weight (G.P.C.) of 510 and a calculated molecular weight of 522. The organosiloxane composition has the average formula,

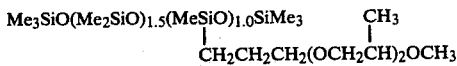

and is hereinafter referred to as Organosiloxane Composition K.

EXAMPLE XII

PART A: PREPARATION OF HYDROSILOXANE FLUID

Into a 500 ml four-necked reaction flask equipped with a mechanical stirrer, thermometer, condenser and nitrogen blow-by was added 56.7 grams (0.35 mole) of hexamethyldisiloxane (Me$_3$SiOSiMe$_3$), 64.75 grams (0.88 mole) of cyclic dimethylsiloxane tetramer (Me$_2$SiO)$_4$ and 31.5 grams (0.525 mole) of poly(methylhydrogensiloxane) (MeHSiO). Also added to the reaction flask was about 3.06 grams (0.031 mole) of sulfuric acid (H$_2$SO$_4$) catalyst corresponding to about 2.0 weight percent of the total weight of the mixture. The mixture was stirred vigorously at room temperature while the sulfuric acid catalyst was added to the reaction flask. The mixture was then heated to 40° C. and vigorously stirred for four hours resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.02 microns. The equilibrated liquid product, now properly designated a hydrosiloxane fluid, is a clear liquid having a calculated molecular weight of 437. The hydrosiloxane fluid has the average formula,

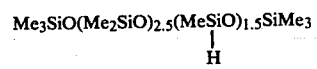

and is hereinafter referred to as Hydrosiloxane Fluid VIII.

PART B: PREPARATION OF ORGANOSILOXANE COMPOSITION

Into a 500 ml four-necked reaction flask equipped with a mechanical stirrer, thermometer, condenser and nitrogen blow-by was added 87.0 grams (0.199 mole) of Hydrosiloxane Fluid VIII. The Hydrosiloxane Fluid VIII was then heated to 85° C. with constant stirring and chloroplatinic acid solution was added to the reaction flask. To the reaction flask was also added dropwise 67.42 grams (0.357 mole) of allylmethoxydipropyleneglycol $$[CH_2=CHCH_2(OCH_2\overset{\underset{\displaystyle CH_3}{|}}{CH})_2OCH_3].$$

The reaction exothermed to 125° C. and after cooling to 110° C., the mixture was kept at that temperature for 20 minutes resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.10 microns. The equilibrated liquid product is an organosiloxane composition having a viscosity of 6.75 cstk at a temperature of 25° C. The organosiloxane composition is a clear amber liquid having an average molecular weight (G.P.C.) of 700 and a calculated molecular weight of 719. The organosiloxane composition has the average formula,

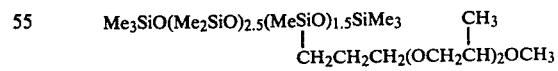

and is hereinafter referred to as Organosiloxane Composition L.

EXAMPLE XIII

PART A: PREPARATION OF HYDROSILOXANE FLUID

Into a 500 ml four-necked reaction flask equipped with a mechanical stirrer, thermometer, condenser and nitrogen blow-by was added 37.2 grams (0.23 mole) of hexamethyldisiloxane (Me$_3$SiOSiMe$_3$), 64.67 grams (0.874 mole) of cyclic dimethylsiloxane tetramer (Me$_2$SiO)$_4$ and 27.6 grams (0.46 mole) of poly(methylhydrogensiloxane) (MeHSiO). Also added to the reaction flask was about 2.59 grams (0.026 mole) of sulfuric acid (H$_2$SO$_4$) catalyst corresponding to about 2.0 weight percent of the total weight of the mixture. The mixture was stirred vigorously at room temperature while the sulfuric acid catalyst was added to the reaction flask. The mixture was then heated to 40° C. and vigorously stirred for four hours resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.02 microns. The equilibrated liquid product, now properly designated a hydrosiloxane fluid, is a clear liquid having a calculated molecular weight of 563. The hydrosiloxane fluid has the average formula,

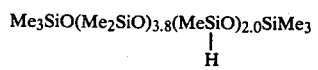

and is hereinafter referred to as Hydrosiloxane Fluid IX.

PART B: PREPARATION OF ORGANOSILOXANE COMPOSITION

Into a 500 ml four-necked reaction flask equipped with a mechanical stirrer, thermometer, condenser and nitrogen blow-by was added 84.48 grams (0.15 mole) of Hydrosiloxane Fluid IX. The Hydrosiloxane Fluid IX was then heated to 85° C. with constant stirring and chloroplatinic acid solution was added to the reaction flask. To the reaction flask was also added dropwise 69.17 grams (0.366 mole) of allylmethoxydipropyleneglycol

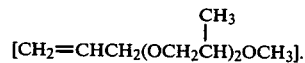

The reaction exothermed to 125° C. and after cooling to 110° C., the mixture was kept at that temperature for 20 minutes resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.10 microns. The equilibrated liquid product is an organosiloxane composition having a viscosity of 9.92 cstk at a temperature of 25° C. The organosiloxane composition is a clear amber liquid having an average molecular weight (G.P.C.) of 935 and a calculated molecular weight of 941. The organosiloxane composition has the average formula,

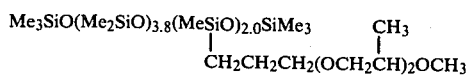

and is hereinafter referred to as Organosiloxane Composition M.

EXAMPLE XIV
PART A: PREPARATION OF HYDROSILOXANE FLUID

Into a 500 ml four-necked reaction flask equipped with a mechanical stirrer, thermometer, condenser and nitrogen blow-by was added 56.7 grams (0.35 mole) of hexamethyldisiloxane (Me$_3$SiOSiMe$_3$), 51.8 grams (0.70 mole) of cyclic dimethylsiloxane tetramer (Me$_2$SiO)$_4$ and 21.8 grams (0.35 mole) of poly(methylhydrogensiloxane) (MeHSiO). Also added to the reaction flask was about 2.6 grams (0.027 mole) of sulfuric acid (H$_2$SO$_4$) catalyst corresponding to about 2.0 weight percent of the total weight of the mixture. The mixture was stirred vigorously at room temperature while the sulfuric acid catalyst was added to the reaction flask. The mixture was then heated to 40° C. and vigorously stirred for four hours resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.02 microns. The equilibrated liquid product, now properly designated a hydrosiloxane fluid, is a clear liquid having a calculated molecular weight of 370. The hydrosiloxane fluid has the average formula,

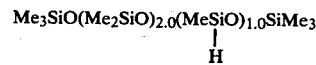

and is hereinafter referred to as Hydrosiloxane Fluid X.

PART B: PREPARATION OF ORGANOSILOXANE COMPOSITION

Into a 500 ml four-necked reaction flask equipped with a mechanical stirrer, thermometer, condenser and nitrogen blow-by was added 92.5 grams (0.25 mole) of Hydrosiloxane Fluid X. The Hydrosiloxane Fluid X was then heated to 85° C. with constant stirring and chloroplatinic acid solution was added to the reaction flask. To the reaction flask was also added dropwise 27.25 grams (0.134 mole) of 3-hydroxy-3-methyl-1-butene [CH$_2$=CHC(CH$_3$)$_2$OH]. The reaction exothermed to 125° C. and after cooling to 110° C., the mixture was kept at that temperature for 20 minutes resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.10 microns. The equilibrated liquid product is an organosiloxane composition having a viscosity of 3.8 cstk at a temperature of 25° C. The organosiloxane composition is a clear amber liquid having an average molecular weight (G.P.C.) of 450 and a calculated molecular weight of 456. The organosiloxane composition has the average formula,

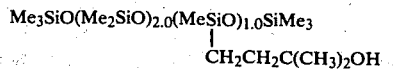

and is hereinafter referred to as Organosiloxane Composition N. The composition and properties of Organosiloxane Composition N are tabulated in Table C below.

EXAMPLE XV
PREPARATION OF ORGANOSILOXANE COMPOSITION

Into a 500 ml four-necked reaction flask equipped with a mechanical stirrer, thermometer, condenser and nitrogen blow-by was added 35.64 grams (0.27 mole) of hexamethyldisiloxane (Me$_3$SiOSiMe$_3$), 61.86 grams (0.836 mole) of cyclic dimethylsiloxane tetramer (MeSiO)$_4$ and 68.64 grams (0.419 mole) of poly[beta-phenylethyl(methyl)siloxane][C$_6$H$_5$CH$_2$CH$_2$(Me)SiO]. Also added to the reaction flask was about 3.1 grams (0.021 mole) of trifluoromethane sulfonic acid (F$_3$CSO$_3$H) catalyst corresponding to about 2.0 weight percent of the total weight of the mixture. The mixture was heated to 85° C. and vigorously stirred for two hours resulting in an equilibrated liquid product. After the equilibration reaction was complete, the reaction flask was cooled to room temperature. The equilibrated liquid product so produced was neutralized with excess sodium bicarbonate (NaHCO$_3$) and filtered through a pressure filter containing an average filter size of 0.10 microns. The equilibrated liquid product is an organosiloxane composition having a viscosity of 11.6 cstk at a temperature of 25° C. The organosiloxane composition is a clear amber liquid having an average molecular weight (G.P.C.) of 750 and a calculated molecular weight of 750. The organosiloxane composition has the average formula, $$\text{Me}_3\text{SiO}(\text{Me}_2\text{SiO})_{3.8}(\text{MeSiO})_{1.9}\text{SiMe}_3$$
$$|$$
$$\text{CH}_2\text{CH}_2\text{C}_6\text{H}_5$$

and is hereinafter referred to as Organosiloxane Composition O. The composition and properties of Organosiloxane Composition O are tabulated in Table D below.

TABLE A
ORGANOSILOXANE COMPOSITIONS (FORMULA I TYPE)

| Organosiloxane Composition | Organosiloxane Composition Structure | Molecular Weight (Calculated) | Molecular Weight (GPC) | x:y Ratio | Viscosity at 25° C. (cstk) |
|---|---|---|---|---|---|
| A | Me$_3$SiO(Me$_2$SiO)$_{1.5}$(MeSiO)$_{1.0}$SiMe$_3$<br>\|<br>CH$_2$CH$_2$CH$_2$CN | 400 | 400 | 1.5 | 6.0 |
| B | Me$_3$SiO(Me$_2$SiO)$_{1.9}$(MeSiO)$_{1.2}$SiMe$_3$<br>\|<br>CH$_2$CH$_2$CH$_2$CN | 450 | 450 | 1.52 | 6.4 |
| C | Me$_3$SiO(Me$_2$SiO)$_{2.4}$(MeSiO)$_{1.5}$SiMe$_3$<br>\|<br>CH$_2$CH$_2$CH$_2$CN | 518 | 500 | 1.73 | 9.12 |
| D | Me$_3$SiO(Me$_2$SiO)$_{3.0}$(MeSiO)$_{0.85}$SiMe$_3$<br>\|<br>CH$_2$CH$_2$CH$_2$CN | 492 | 480 | 3.52 | 5.3 |
| E | Me$_3$SiO(Me$_2$SiO)$_{1.7}$(MeSiO)$_{1.0}$SiMe$_3$<br>\|<br>CH$_2$CH$_2$CH$_2$OCH$_2$CH$_2$CN | 459 | 450 | 1.7 | 8.54 |
| F | Me$_3$SiO(Me$_2$SiO)$_{2.5}$(MeSiO)$_{1.5}$SiMe$_3$<br>\|<br>CH$_2$CH$_2$CH$_2$OCH$_2$CH$_2$CN | 600 | 600 | 1.67 | 11.3 |
| G | Me$_3$SiO(Me$_2$SiO)$_{3.0}$(MeSiO)$_{1.0}$SiMe$_3$<br>\|<br>CH$_2$CH$_2$CH$_2$OCH$_2$CH$_2$CN | 555 | 550 | 3.0 | 9.53 |
| H | Me$_3$SiO(Me$_2$SiO)$_{6.0}$(MeSiO)$_{3.5}$SiMe$_3$<br>\|<br>CH$_2$CH$_2$CH$_2$OCH$_2$CH$_2$CN | 1205 | 1200 | 1.7 | 22.5 |

TABLE B
ORGANOSILOXANE COMPOSITIONS (FORMULA II TYPE)

| Organosiloxane Composition | Organosiloxane Composition Structure | Molecular Weight (Calculated) | Molecular Weight (GPC) | x:y Ratio | Viscosity at 25° C. (cstk) |
|---|---|---|---|---|---|
| I | Me$_3$SiO(Me$_2$SiO)$_{1.7}$(MeSiO)$_{1.0}$SiMe$_3$<br>\|<br>CH$_2$CH$_2$CH$_2$(OC$_2$H$_4$)$_3$OMe | 552 | 500 | 1.7 | 6.5 |
| J | Me$_3$SiO(Me$_2$SiO)$_{5.0}$(MeSiO)$_{2.0}$SiMe$_3$<br>\|<br>CH$_2$CH$_2$CH$_2$(OC$_2$H$_4$)$_3$OMe | 1060 | 1000 | 2.5 | 14.3 |
| K | Me$_3$SiO(Me$_2$SiO)$_{1.5}$(MeSiO)$_{1.5}$SiMe$_3$  CH$_3$<br>\|                           \|<br>CH$_2$CH$_2$CH$_2$(OCH$_2$CH)$_2$OMe | 522 | 510 | 1.5 | 4.52 |
| L | Me$_3$SiO(Me$_2$SiO)$_{2.5}$(MeSiO)$_{1.5}$SiMe$_3$  CH$_3$<br>\|                           \|<br>CH$_2$CH$_2$CH$_2$(OCH$_2$CH)$_2$OMe | 719 | 700 | 1.67 | 6.75 |
| M | Me$_3$SiO(Me$_2$SiO)$_{3.8}$(MeSiO)$_{2.0}$SiMe$_3$  CH$_3$<br>\|                           \|<br>CH$_2$CH$_2$CH$_2$(OCH$_2$CH)$_2$OMe | 941 | 935 | 1.9 | 9.92 |

TABLE C

| | ORGANOSILOXANE COMPOSITIONS (FORMULA III TYPE) | | | | |
|---|---|---|---|---|---|
| Organosiloxane Composition | Organosiloxane Composition Structure | Molecular Weight (Calculated) | Molecular Weight (GPC) | x:y Ratio | Viscosity at 25° C. (cstk) |
| N | Me$_3$SiO(Me$_2$SiO)$_{2.0}$(MeSiO)$_{1.0}$SiMe$_3$<br>                                                     CH$_2$CH$_2$C(CH$_3$)$_2$OH | 456 | 450 | 2.0 | 3.8 |

TABLE D

| | ORGANOSILOXANE COMPOSITIONS (FORMULA IV TYPE) | | | | |
|---|---|---|---|---|---|
| Organosiloxane Composition | Organosiloxane Composition Structure | Molecular Weight (Calculated) | Molecular Weight (GPC) | x:y Ratio | Viscosity at 25° C. (cstk) |
| O | Me$_3$SiO(Me$_2$SiO)$_{3.8}$(MeSiO)$_{1.9}$SiMe$_3$<br>                                                     CH$_2$CH$_2$C$_6$H$_5$ | 750 | 750 | 2.0 | 11.6 |

EXAMPLES XVI through XC

In accordance with these examples, flexible polyester polyurethane foams were produced using the above-described Organosiloxane Compositions A through O as the foam stabilizing surfactant component of the foam-producing reaction mixtures. For the purpose of comparison, three commercially available foam stabilizing surfactants outside the scope of this invention were used and are designated herein as Organosiloxane Composition PP, Organosiloxane Composition QQ and Organosiloxane Composition RR. These foam stabilizing surfactants have the following average composition:

Organosiloxane Composition PP

A flexible polyester polyurethane foam surfactant mixture within the scope of U.S. Pat. No. 3,594,334.

Organosiloxane Composition QQ

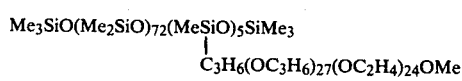

Me$_3$SiO(Me$_2$SiO)$_{72}$(MeSiO)$_5$SiMe$_3$
                                         C$_3$H$_6$(OC$_3$H$_6$)$_{27}$(OC$_2$H$_4$)$_{24}$OMe (A flexible polyether polyurethane foam surfactant)

Organosiloxane Composition RR

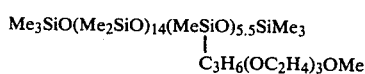

Me$_3$SiO(Me$_2$SiO)$_{14}$(MeSiO)$_{5.5}$SiMe$_3$
                                           C$_3$H$_6$(OC$_2$H$_4$)$_3$OMe (A high resilience polyether polyurethane foam surfactant)

Additionally, five other organosiloxane compositions outside the scope of this invention were used for the purpose of comparison and are designated herein as Organosiloxane Composition SS, Organosiloxane Composition TT, Organosiloxane Composition UU, Organosiloxane Composition VV and Organosiloxane Composition WW. These organosiloxane compositions have the following average formula:

Organosiloxane Composition SS

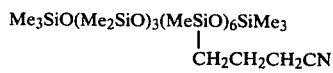

Me$_3$SiO(Me$_2$SiO)$_3$(MeSiO)$_6$SiMe$_3$
                                   CH$_2$CH$_2$CH$_2$CN (x:y ratio of 0.5 outside the scope of this invention)

Organosiloxane Composition TT

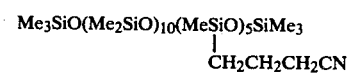

Me$_3$SiO(Me$_2$SiO)$_{10}$(MeSiO)$_5$SiMe$_3$
                                   CH$_2$CH$_2$CH$_2$CN (molecular weight of 1540 outside the scope of this invention)

Organosiloxane Composition UU

Me$_3$SiO(Me$_2$SiO)$_{6.0}$(MeSiO)$_{4.5}$SiMe$_3$
                                     CH$_2$CH$_2$CH$_2$(OC$_2$H$_4$)$_3$OMe (molecular weight of 1794 outside the scope of this invention)

Organosiloxane Composition VV

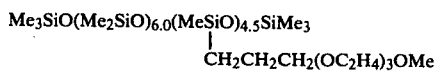

Me$_3$SiO(Me$_2$SiO)$_8$(MeSiO)$_5$SiMe$_3$
                                   CH$_2$CH$_2$CH$_2$(OC$_2$H$_4$)$_3$OMe (molecular weight of 2075 outside the scope of this invention)

Organosiloxane Composition WW

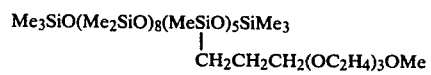

Me$_3$SiO(Me$_2$SiO)$_{15}$(MeSiO)$_3$SiMe$_3$    CH$_3$
                                    CH$_2$CH$_2$CH$_2$(OCH$_2$CH)$_2$OMe (x:y ratio of 5.0 and molecular weight of 2064 outside the scope of this invention).

Organosiloxane Compositions A through O were employed as a solution in the formulation of low density flexible polyester polyurethane foams described in the Examples hereinbelow. Each solution contained the following: (1) an organosiloxane composition in an amount of from 10 to 80 parts by weight per 100 parts by weight of the solution; (2) an organic acidic component comprising tall oil in an amount of from 5 to 90 parts by weight per 100 parts by weight of the organosiloxane composition present in the solution and, additionally, at least one of the following ingredients: (3) an anionic organic surfactant consisting of sodium sulfonate of a hydrocarbon mixture a typical analysis of which is (weight percent) 62.0 sodium sulfonate, 32.7 mineral oil, 4.5 water, 0.7 inorganic salt, average molecular weight of sulfonate portion is 435, flash point C.O.C. 400° F., available commercially as "Bryton 430"; (4) an anionic organic surfactant consisting of sodium sulfonate of a hydrocarbon mixture, available commercially as "Petronate L" (Witco Chemical Company); (5) a non ionic organic surfactant in which the hydrophobe is a mixture of $C_{11-15}$ alcohols and the hydrophile is ethylene oxide (average 9 mols/mol of hydrophobe); (6) a water soluble glycol comprising hexylene glycol; when both the organic surfactant, i.e., (3), (4) and (5) including combinations thereof, and the water soluble glycol, i.e., hexylene glycol, are present in the solution, the combined concentration thereof ranges from 5 to 90 parts by weight per 100 parts by weight of the organosiloxane composition contained therein and when only one of these components is present, the concentration thereof is also within this latter range; and (7) di-tert-butyl-p-cresol ("Ionol") in an amount of about 1 part by weight per 100 parts by weight of the solution.

By way of illustration of the solutions described above, the following are typical solutions employed in the formulation of low density flexible polyester polyurethane foams described in the Examples hereinbelow. A typical solution containing a cyano-organosiloxane composition, as demonstrated by Example XVI, consists essentially of components (1), (2), (4), (5), (6) and (7) described above. A typical solution containing an ether-organosiloxane composition, as demonstrated by Example XLVII, consists essentially of components (1), (2), (3), (4), (6) and (7) described above. A typical solution containing a hydroxy-organosiloxane composition, as demonstrated by Example LXXXVI, consists essentially of components (1), (2), (3), (5), (6) and (7) described above. A typical solution containing a phenyl-organosiloxane composition, as demonstrated in Example XC, consists essentially of components (1), (2), (4), (5), (6) and (7) described above.

Comparative Organosiloxane Compositions PP through WW outside the scope of this invention were also employed as a solution in the formulation of flexible polyester polyurethane foams described in the Examples hereinbelow. Organosiloxane Composition PP was employed in a solution consisting of 35 weight percent organosiloxane composition, 35 weight percent anionic organic surfactant described hereinabove ("Bryton 430"), 15 weight percent tall oil, 15 weight percent hexylene glycol and 2500 parts per million parts of the solution on a weight basis of di-tert-butyl-p-cresol ("Ionol"). Organosiloxane Composition QQ was employed in a solution consisting of 40 to 60 weight percent organosiloxane composition and 40 to 60 weight percent organic solvent. Organosiloxane Composition RR was employed in a solution consisting of 50 weight percent organosiloxane composition and 50 weight percent organic solvent. Organosiloxane Composition SS through WW were employed as solutions in which the solution ingredients were identical (except, of course, a different organosiloxane composition) to the solutions containing Organosiloxane Compositions A through O described hereinabove.

Organosiloxane Compositions A through O and comparative Organosiloxane Compositions PP through WW outside the scope of this invention were present in the final foam-producing reaction mixture in an amount (exclusive of solvents or other additives) of from 0.15 to 4.0 parts by weight per 100 parts by weight of the polyester polyol reactant. The amounts of organosiloxane composition surfactant present in the flexible polyester polyurethane foam formulations described in the Examples hereinbelow refers to the concentration of the organosiloxane composition solution (inclusive of solvents or other additives) rather than to the organosiloxane composition alone.

Procedure for Preparation of Flexible Polyester Polyurethane Foam

The foam-producing reactions of Examples XVI through XC were carried out in accordance with substantially the same general procedure which entailed the following steps. The organosiloxane composition surfactant, amine catalysts and water were premixed in a 50 milliliter beaker. The polyester polyol reactant was weighed into a tared 32-ounce capacity container. The flame retardant and tolylene diisocyanate reactant were also weighed into the tared 32-ounce capacity container and mixed with a spatula until homogeneous. Further mixing was done on a drill press equipped with a double three-bladed marine-type propeller about 3 inches in diameter. The mixing in the drill press was accomplished at 1000 revolutions per minute for 8 seconds. Then the premixture of organosiloxane composition surfactant, catalyst and water was added and mixing was continued for 7 additional seconds. The reaction mixture was poured into a one foot by one foot by one foot cardboard box, was allowed to rise and was then cured for about 30 minutes at 120° C. All foams were then removed from the oven and aged overnight at ambient temperature before being processed and observed for properties.

The results of examples in which organosiloxane compositions of the type represented by formula (I) above are utilized as the foam stabilizing surfactant component of the foam-producing reaction mixture are given in Table E below.

TABLE E
EVALUATION OF ORGANOSILOXANE COMPOSITIONS (FORMULA I TYPE) IN FLEXIBLE POLYESTER POLYURETHANE FOAM FORMULATIONS

| EXAMPLE | XVI | XVII | XVIII | XIX | XX | XXI | XXII | XXIII |
|---|---|---|---|---|---|---|---|---|
| Polyester Polyol, parts | 100 | 100 | 100 | 100 | 100 | 100 | 100 | 100 |
| Water, parts | 5.0 | 5.0 | 5.0 | 5.0 | 5.0 | 3.6 | 3.6 | 3.6 |
| Catalyst, parts | 2.0 | 2.0 | 2.0 | 2.0 | 2.0 | 2.0 | 2.0 | 2.0 |
| Hexadecyldimethylamine, parts | 0.3 | 0.3 | 0.3 | 0.3 | 0.3 | 0.3 | 0.3 | 0.3 |
| Organosiloxane Composition Surfactant Type | A | A | B | B | B | B | B | B |
| Organosiloxane Composition Surfactant, parts | 0.75 | 1.0 | 0.75 | 1.25 | 1.60 | 0.75 | 1.0 | 1.25 |
| Flame Retardant, parts | — | — | — | — | — | 7.0 | 7.0 | 7.0 |
| Tolylene Diisocyanate (Index 105), parts | 58.9 | 58.9 | 58.9 | 58.9 | 58.9 | 44.97 | 44.97 | 44.97 |
| Cream Time, Seconds | 6.5 | 7.0 | 6.5 | 7.0 | 7.0 | 5.0 | 4.5 | 4.5 |
| Rise Time, Seconds | 68 | 70 | 68 | 70 | 72 | 58 | 57 | 57 |
| Cells Per Inch | 40–45 | 40–45 | 35–40 | 40–45 | 40–45 | 30–35 | 40–45 | 40–45 |

TABLE E-continued
EVALUATION OF ORGANOSILOXANE COMPOSITIONS (FORMULA I TYPE) IN FLEXIBLE POLYESTER POLYURETHANE FOAM FORMULATIONS

| | | | | | | | | |
|---|---|---|---|---|---|---|---|---|
| Density, pcf | 1.19 | 1.18 | 1.19 | 1.21 | 1.17 | 1.68 | 1.65 | 1.60 |
| Comments | — | — | — | — | — | — | — | — |

| EXAMPLE | XXIV | XXV | XXVI | XXVII | XXVIII | XXIX | XXX | XXXI |
|---|---|---|---|---|---|---|---|---|
| Polyester Polyol, parts | 100 | 100 | 100 | 100 | 100 | 100 | 100 | 100 |
| Water, parts | 5.0 | 5.0 | 5.0 | 3.6 | 3.6 | 5.0 | 5.0 | 5.0 |
| Catalyst, parts | 2.0 | 2.0 | 2.0 | 2.0 | 2.0 | 2.0 | 2.0 | 2.0 |
| Hexadecyldimethylamine, parts | 0.3 | 0.3 | 0.3 | 0.3 | 0.3 | 0.3 | 0.3 | 0.3 |
| Organosiloxane Composition Surfactant Type | B | C | C | C | C | D | E | E |
| Organosiloxane Composition Surfactant, parts | 1.0 | 0.2 | 0.4 | 0.6 | 0.8 | 1.0 | 0.75 | 1.25 |
| Flame Retardant, parts | — | — | — | 7.0 | 7.0 | — | — | — |
| Tolylene Diisocyanate (Index 105), parts | 58.9 | 58.9 | 58.9 | 44.97 | 44.97 | 58.9 | 58.9 | 58.9 |
| Cream Time, Seconds | 6.8 | 5.0 | 5.0 | 4.0 | 4.5 | 7.0 | 6.2 | 6.3 |
| Rise Time, Seconds | 70 | 70 | 70 | 58 | 55 | 68 | 70 | 72 |
| Cells Per Inch | 35–40 | 20–25 | 25–30 | 35–40 | 35–40 | 35–40 | 30–35 | 40–45 |
| Density, pcf | 1.17 | 1.31 | 1.28 | 1.70 | 1.75 | 1.15 | 1.19 | 1.21 |
| Comments | — | — | — | — | — | — | — | — |

| EXAMPLE | XXXII | XXXIII | XXXIV | XXXV | XXXVI | XXXVII | XXXVIII | XXXIX |
|---|---|---|---|---|---|---|---|---|
| Polyester Polyol, parts | 100 | 100 | 100 | 100 | 100 | 100 | 100 | 100 |
| Water, parts | 5.0 | 5.0 | 5.0 | 5.0 | 5.0 | 5.0 | 5.0 | 5.0 |
| Catalyst, parts | 2.0 | 2.0 | 2.0 | 2.0 | 2.0 | 2.0 | 2.0 | 2.0 |
| Hexadecyldimethylamine, parts | 0.3 | 0.3 | 0.3 | 0.3 | 0.3 | 0.3 | 0.3 | 0.3 |
| Organosiloxane Composition Surfactant Type | E | E | F | G | G | H | SS | SS |
| Organosiloxane Composition Surfactant, parts | 1.5 | 1.0 | 0.75 | 0.6 | 0.8 | 0.2 | 0.2 | 0.4 |
| Flame Retardant, parts | — | — | — | — | — | — | — | — |
| Tolylene Diisocyanate (Index 105), parts | 58.9 | 58.9 | 58.9 | 58.9 | 58.9 | 58.9 | 58.9 | 58.9 |
| Cream Time, Seconds | 6.2 | 6.5 | 6.5 | 7.0 | 6.8 | 6.0 | — | — |
| Rise Time, Seconds | 70 | 69 | 72 | 68 | 70 | 70 | — | — |
| Cells Per Inch | 40–45 | 35–40 | 35–40 | 40–45 | 40–45 | 35–40 | — | — |
| Density, pcf | 1.19 | 1.19 | 1.19 | 1.20 | 1.18 | 1.33 | — | — |
| Comments | — | — | — | — | — | — | Collapse | Collapse |

| EXAMPLE | XL | XLI |
|---|---|---|
| Polyester Polyol, parts | 100 | 100 |
| Water, parts | 5.0 | 5.0 |
| Catalyst, parts | 2.0 | 2.0 |
| Hexadecyldimethylamine, parts | 0.3 | 0.3 |
| Organosiloxane Composition Surfactant Type | SS | TT |
| Organosiloxane Composition Surfactant, parts | 0.6 | 1.0 |
| Flame Retardant, parts | — | — |
| Tolylene Diisocyanate (index 105), parts | 58.9 | 58.9 |
| Cream Time, Seconds | — | — |
| Rise Time, Seconds | — | — |
| Cells Per Inch | — | — |
| Density, pcf | — | — |
| Comments | Collapse | Collapse |

The data of Table E demonstrates that Organosiloxane Compositions A through H are effective stabilizers of low density flexible polyester polyurethane foam as evidenced by excellent physical properties including high cell counts. With the exception of Organosiloxane Compositions D, F and H in which sufficient data is not available to make a determination, the remaining Organosiloxane Compositions A, B, C, E and G possess the further desirable property of at least moderately wide processing latitude. This is evidenced from the available Examples in which the organosiloxane composition, when employed in various concentration amounts of at least moderately wide latitude, produces low density flexible polyester polyurethane foams having desirable physical properties including high cell counts.

The results of examples in which organosiloxane compositions of the type represented by Formula (II) above are utilized as the foam stabilizing surfactant component of the foam-producing reaction mixture are given in Table F below.

TABLE F
EVALUATION OF ORGANOSILOXANE COMPOSITIONS (FORMULA II TYPE) IN FLEXIBLE POLYESTER POLYURETHANE FOAM FORMULATIONS

| EXAMPLE | XLII | XLIII | XLIV | XLV | XLVI | XLVII | XLVIII | XLIX |
|---|---|---|---|---|---|---|---|---|
| Polyester Polyol, parts | 100 | 100 | 100 | 100 | 100 | 100 | 100 | 100 |
| Water, parts | 5.0 | 5.0 | 5.0 | 3.6 | 3.6 | 3.6 | 5.0 | 5.0 |
| Catalyst, parts | 2.0 | 2.0 | 2.0 | 2.0 | 2.0 | 2.0 | 2.0 | 2.0 |
| Hexadecyldimethylamine, parts | 0.3 | 0.3 | 0.3 | 0.3 | 0.3 | 0.3 | 0.3 | 0.3 |
| Organosiloxane Composition Surfactant Type | I | I | I | I | I | I | I | J |

TABLE F-continued
EVALUATION OF ORGANOSILOXANE COMPOSITIONS (FORMULA II TYPE) IN FLEXIBLE POLYESTER POLYURETHANE FOAM FORMULATIONS

| | | | | | | | | |
|---|---|---|---|---|---|---|---|---|
| Organosiloxane Composition Surfactant, parts | 0.75 | 1.25 | 1.6 | 0.5 | 1.0 | 1.25 | 1.0 | 1.0 |
| Flame Retardant, parts | — | — | — | 7.0 | 7.0 | 7.0 | — | — |
| Tolylene Diisocyanate (Index 105), parts | 58.9 | 58.9 | 58.9 | 44.97 | 44.97 | 44.97 | 58.9 | 58.9 |
| Cream Time, Seconds | 7.0 | 7.0 | 7.0 | 3.6 | 4.0 | 4.0 | 6.8 | 6.0 |
| Rise Time, Seconds | 68 | 70 | 72 | 50 | 55 | 53 | 70 | 71 |
| Cells Per Inch | 30–35 | 30–35 | 40–45 | 35–40 | 35–40 | 40–45 | 35–40 | 40–45 |
| Density, pcf | 1.25 | 1.19 | 1.17 | 1.71 | 1.65 | 1.60 | 1.17 | 1.28 |
| Comments | — | — | — | — | — | — | — | — |

| EXAMPLE | L | LI | LII | LIII | LIV | LV | LVI | LVII |
|---|---|---|---|---|---|---|---|---|
| Polyester Polyol, parts | 100 | 100 | 100 | 100 | 100 | 100 | 100 | 100 |
| Water, parts | 3.6 | 3.6 | 3.6 | 5.0 | 5.0 | 5.0 | 3.6 | 3.6 |
| Catalyst, parts | 2.0 | 2.0 | 2.0 | 2.0 | 2.0 | 2.0 | 2.0 | 2.0 |
| Hexadecyldimethylamine, parts | 0.3 | 0.3 | 0.3 | 0.3 | 0.3 | 0.3 | 0.3 | 0.3 |
| Organosiloxane Composition Surfactant Type | K | K | K | L | L | L | L | L |
| Organosiloxane Composition Surfactant, parts | 0.1 | 0.4 | 1.0 | 0.75 | 1.25 | 1.6 | 0.5 | 1.0 |
| Flame Retardant, parts | 7.0 | 7.0 | 7.0 | — | — | — | 7.0 | 7.0 |
| Tolylene Diisocyanate (Index 105), parts | 44.97 | 44.97 | 44.97 | 58.9 | 58.9 | 58.9 | 44.97 | 44.97 |
| Cream Time, Seconds | 4.0 | 4.5 | 4.5 | 6.0 | 6.5 | 6.0 | 4.0 | 5.0 |
| Rise Time, Seconds | 58 | 55 | 54 | 70 | 69 | 70 | 56 | 56 |
| Cells Per Inch | 30–35 | 35–40 | 40–45 | 35–40 | 40–45 | 40–45 | 30–35 | 35–40 |
| Density, pcf | 1.70 | 1.75 | 1.73 | 1.28 | 1.23 | 1.18 | 1.73 | 1.67 |
| Comments | — | — | — | — | — | — | — | — |

| EXAMPLE | LVIII | LIX | LX | LXI | LXII | LXIII | LXIV | LXV |
|---|---|---|---|---|---|---|---|---|
| Polyester Polyol, parts | 100 | 100 | 100 | 100 | 100 | 100 | 100 | 100 |
| Water, parts | 3.6 | 5.0 | 5.0 | 5.0 | 5.0 | 5.0 | 5.0 | 5.0 |
| Catalyst, parts | 2.0 | 2.0 | 2.0 | 2.0 | 2.0 | 2.0 | 2.0 | 2.0 |
| Hexadecyldimethylamine, parts | 0.3 | 0.3 | 0.3 | 0.3 | 0.3 | 0.3 | 0.3 | 0.3 |
| Organosiloxane Composition Surfactant Type | L | L | M | M | M | M | M | PP |
| Organosiloxane Composition Surfactant, parts | 1.25 | 1.0 | 0.4 | 0.75 | 1.0 | 1.25 | 1.5 | 0.5 |
| Flame Retardant, parts | 7.0 | — | — | — | — | — | — | — |
| Tolylene Diisocyanate (Index 105), parts | 44.97 | 58.9 | 58.9 | 58.9 | 58.9 | 58.9 | 58.9 | 58.9 |
| Cream Time, Seconds | 4.0 | 7.2 | — | 6.5 | 7.0 | 6.5 | 7.0 | — |
| Rise Time, Seconds | 55 | 68 | — | 70 | 70 | 75 | 73 | — |
| Cells Per Inch | 40–45 | 35–40 | — | 35–40 | 40–45 | 35–40 | 40–45 | — |
| Density, pcf | 1.62 | 1.17 | — | 1.19 | 1.21 | 1.19 | 1.17 | — |
| Comments | — | — | Collapse | — | — | — | — | Collapse |

| EXAMPLE | LXVI | LXVII | LXVIII | LXIX | LXX | LXXI | LXXII | LXXIII |
|---|---|---|---|---|---|---|---|---|
| Polyester Polyol, parts | 100 | 100 | 100 | 100 | 100 | 100 | 100 | 100 |
| Water, parts | 5.0 | 5.0 | 3.6 | 3.6 | 5.0 | 5.0 | 5.0 | 5.0 |
| Catalyst, parts | 2.0 | 2.0 | 2.0 | 2.0 | 2.0 | 2.0 | 2.0 | 2.0 |
| Hexadecyldimethylamine, parts | 0.3 | 0.3 | 0.3 | 0.3 | 0.3 | 0.3 | 0.3 | 0.3 |
| Organosiloxane Composition Surfactant Type | PP | PP | PP | PP | QQ | QQ | RR | RR |
| Organosiloxane Composition Surfactant, parts | 0.10 | 0.16 | 1.0 | 1.3 | 1.5 | 1.25 | 1.5 | 1.25 |
| Flame Retardant, parts | — | — | 7.0 | 7.0 | — | — | — | — |
| Tolylene Diisocyanate (Index 105), parts | 58.9 | 58.9 | 44.97 | 44.97 | 58.9 | 58.9 | 58.9 | 58.9 |
| Cream Time, Seconds | 6.0 | 6.0 | 4.0 | 4.5 | — | — | — | — |
| Rise Time, Seconds | 68 | 70 | 56 | 55 | — | — | — | — |
| Cells Per Inch | 15–20 | 20–25 | 30–35 | 35–40 | — | — | — | — |
| Density, pcf | 1.35 | 1.37 | 1.70 | 1.75 | — | — | — | — |
| Comments | — | — | — | — | Collapse | Collapse | Collapse | Collapse |

| EXAMPLE | LXXIV | LXXV | LXXVI | LXXVII | LXXVIII | LXXIX | LXXX | LXXXI | LXXXII |
|---|---|---|---|---|---|---|---|---|---|
| Polyester Polyol, parts | 100 | 100 | 100 | 100 | 100 | 100 | 100 | 100 | 100 |
| Water, parts | 5.0 | 5.0 | 5.0 | 5.0 | 5.0 | 5.0 | 5.0 | 5.0 | 5.0 |
| Catalyst, parts | 2.0 | 2.0 | 2.0 | 2.0 | 2.0 | 2.0 | 2.0 | 2.0 | 2.0 |
| Hexadecyldimethylamine, parts | 0.3 | 0.3 | 0.3 | 0.3 | 0.3 | 0.3 | 0.3 | 0.3 | 0.3 |
| Organosiloxane Composition Surfactant Type | UU | UU | UU | VV | VV | VV | VV | WW | WW |
| Organosiloxane Composition Surfactant, parts | 1.0 | 1.25 | 0.75 | 1.25 | 1.5 | 1.0 | 0.5 | 0.4 | 0.75 |
| Flame Retardant, parts | — | — | — | — | — | — | — | — | — |
| Tolylene Diisocyanate (Index 105), parts | 58.9 | 58.9 | 58.9 | 58.9 | 58.9 | 58.9 | 58.9 | 58.9 | 58.9 |
| Cream Time, Seconds | — | — | — | — | — | — | — | — | — |
| Rise Time, Seconds | — | — | — | — | — | — | — | — | — |
| Cells Per Inch | — | — | — | — | — | — | — | — | — |
| Density, pcf | — | — | — | — | — | — | — | — | — |
| Comments | Collapse | Collapse | Collapse | Collapse | Collapse | Collapse | Collapse | Collapse | Collapse |

| EXAMPLE | LXXXIII | LXXXIV |
|---|---|---|

TABLE F-continued
EVALUATION OF ORGANOSILOXANE COMPOSITIONS (FORMULA II TYPE) IN FLEXIBLE POLYESTER POLYURETHANE FOAM FORMULATIONS

| | | |
|---|---|---|
| Polyester Polyol, parts | 100 | 100 |
| Water, parts | 5.0 | 5.0 |
| Catalyst, parts | 2.0 | 2.0 |
| Hexadecyldimethylamine, parts | 0.3 | 0.3 |
| Organosiloxane Composition Surfactant Type | WW | WW |
| Organosiloxane Composition Surfactant, parts | 1.0 | 1.25 |
| Flame Retardant, parts | — | — |
| Tolylene Diisocyanate (Index 105), parts | 58.9 | 58.9 |
| Cream Time, Seconds | — | — |
| Rise Time, Seconds | — | — |
| Cells Per Inch | — | — |
| Density, pcf | — | — |
| Comments | Collapse | Collapse |

The data of Table F demonstrates that Organosiloxane Compositions I through M are effective stabilizers of low density flexible polyester polyurethane foam as evidenced by excellent physical properties including high cell counts. With the exception of Organosiloxane Composition J in which sufficient data is not available to make a determination, the remaining Organosiloxane Compositions I, K, L and M possess the further desirable property of wide processing latitude. This is evidenced from the available Examples in which the organosiloxane composition, when employed in various concentration amounts of wide latitude, produces low density flexible polyester polyurethane foams having desirable physical properties including high cell counts. As evidenced from the data of Example LXIX, comparative Organosiloxane Composition PP is capable of stabilizing low density flexible polyester polyurethane foam having desirable physical properties at a very narrow concentration range. The remaining Examples in which comparative Organosiloxane Composition PP is utilized as the foam stabilizing surfactant demonstrate foams having some desirable physical properties but possessing very low or moderate cell counts.

The results of examples in which organosiloxane compositions of the type represented by Formula (III) above are utilized as the foam stabilizing surfactant component of the foam-producing reaction mixture are given in Table G below.

TABLE G
EVALUATION OF ORGANOSILOXANE COMPOSITIONS (FORMULA III TYPE) IN FLEXIBLE POLYESTER POLYURETHANE FOAM FORMULATIONS

| EXAMPLE | LXXXV | LXXXVI |
|---|---|---|
| Polyester Polyol, parts | 100 | 100 |
| Water, parts | 5.0 | 5.0 |
| Catalyst, parts | 2.0 | 2.0 |
| Hexadecyldimethylamine, parts | 0.3 | 0.3 |
| Organosiloxane Composition Surfactant Type | N | N |
| Organosiloxane Composition Surfactant, parts | 1.25 | 1.5 |
| Flame Retardant, parts | — | — |
| Tolylene Diisocyanate (Index 105), parts | 58.9 | 58.9 |
| Cream Time, Seconds | 6.5 | 7.0 |
| Rise Time, Seconds | 75 | 73 |
| Cells Per Inch | 35–40 | 40–45 |
| Density, pcf | 1.19 | 1.17 |
| Comments | — | — |

The data of Table G demonstrates the Organosiloxane Composition N is an effective stabilizer of low density flexible polyester polyurethane foam as evidenced by excellent physical properties including high cell counts and possesses the further desirable property of at least moderately wide processing latitude. This is evidenced from the available Examples in which the organosiloxane composition, when employed in various concentration amounts of at least moderately wide latitude, produces low density flexible polyester polyurethane foams having desirable physical properties including high cell counts.

The results of examples in which organosiloxane compositions of the type represented by Formula (IV) above are utilized as the foam stabilizing surfactant component of the foam-producing reaction mixture are given in Table H below.

TABLE H
EVALUATION OF ORGANOSILOXANE COMPOSITIONS (FORMULA IV TYPE) IN FLEXIBLE POLYESTER POLYURETHANE FOAM FORMULATIONS

| EXAMPLE | LXXXVII | LXXXVIII | LXXXIX | XC |
|---|---|---|---|---|
| Polyester Polyol, parts | 100 | 100 | 100 | 100 |
| Water, parts | 5.0 | 5.0 | 5.0 | 5.0 |
| Catalyst, parts | 2.0 | 2.0 | 2.0 | 2.0 |
| Hexadecyldimethylamine, parts | 0.3 | 0.3 | 0.3 | 0.3 |
| Organosiloxane Composition Surfactant Type | O | O | O | O |
| Organosiloxane Composition Surfactant, parts | 0.75 | 1.0 | 1.25 | 1.5 |
| Flame Retardant, parts | — | — | — | — |
| Tolylene Diisocyanate (Index 105), parts | 58.9 | 58.9 | 58.9 | 58.9 |
| Cream Time, Seconds | 6.7 | 6.8 | 6.3 | 6.8 |
| Rise Time, Seconds | 68 | 70 | 71 | 72 |

TABLE H-continued

EVALUATION OF ORGANOSILOXANE COMPOSITIONS (FORMULA IV TYPE) IN FLEXIBLE POLYESTER POLYURETHANE FOAM FORMULATIONS

| EXAMPLE | LXXXVII | LXXXVIII | LXXXIX | XC |
|---|---|---|---|---|
| Cells Per Inch | 35–40 | 35–40 | 35–40 | 40–45 |
| Density, pcf | 1.21 | 1.17 | 1.21 | 1.20 |
| Comments | — | — | — | — |

The data of Table H demonstrates that Organosiloxane Composition O is an effective stabilizer of low density flexible polyester polyurethane foam as evidenced by excellent physical properties including high cell counts and possesses the further desirable property of wide processing latitude. This is evidenced from the available Examples in which the organosiloxane composition, when employed in various concentration amounts of wide latitude, produces low density flexible polyester polyurethane foams having desirable physical properties including high cell counts.

EXAMPLES XCI THROUGH CVI

In accordance with these examples, flexible polyester polyurethane foams were produced on an industrial scale machine using Organosiloxane Composition I and comparative Organosiloxane Composition PP outside the scope of this invention as the foam stabilizing surfactant component of the foam-producing reaction mixtures. The purpose of these examples was to determine whether the organosiloxane compositions, as illustrated by Organosiloxane Composition I, are capable of providing semi-commercial size foam buns having acceptable physical properties including high cell counts. In these examples, a Hennecke UBT-63 high pressure continuous polyurethane foam machine was used to which the following three streams were added: (1) the polyester polyol; (2) the activator stream containing water, amine catalyst and organosiloxane composition foam stabilizing surfactants; and (3) the polyisocyanate reactant. The mixer speed was about 5000 revolutions per minute and the head pressure was 10–18 pounds per square inch. At ambient temperature the emerging foam mixture was poured onto paper on a continuously moving conveyor belt. The foams were allowed to set and cure in the form of large slabs (12 feet in length, 22 inches wide and 18 inches high). After 24 hours of aging at ambient temperature, the foams were cut and submitted for physical property measurements. The composition of the foam formulations and the results of physical property measurements are given in Table I and Table J which follow.

TABLE I

EVALUATION OF ORGANOSILOXANE COMPOSITIONS IN FLEXIBLE POLYESTER POLYURETHANE FOAM FORMULATIONS (INDUSTRIAL SCALE MACHINE)

| EXAMPLE | XCI | XCII | XCIII | XCIV | XCV | XCVI | XCVII |
|---|---|---|---|---|---|---|---|
| Polyester Polyol, parts | 100 | 100 | 100 | 100 | 100 | 100 | 100 |
| Water, parts | 3.6 | 3.6 | 5.0 | 5.5 | 5.0 | 3.6 | 3.6 |
| Catalyst, parts | 2.0 | 2.0 | 2.0 | 2.0 | 2.0 | 2.0 | 2.0 |
| Hexadecyldimethylamine, parts | 0.3 | 0.3 | 0.3 | 0.3 | 0.3 | 0.3 | 0.3 |
| Organosiloxane Composition Surfactant Type | I | I | I | I | I | PP | PP |
| Organosiloxane Composition Surfactant, parts | 0.75 | 1.0 | 1.0 | 1.5 | 2.0 | 1.0 | 1.3 |
| Flame Retardant, parts | — | — | — | — | — | — | — |
| Tolylene Diisocyanate (Index 105), parts | 44.97 | 44.97 | 59.2 | 64.3 | 59.2 | 44.97 | 44.97 |
| Cream Time, Seconds | 3.7 | 4.5 | 7.0 | 7.0 | 6.5 | 3.5 | 4.2 |
| Rise Time, Seconds | 56 | 55 | 76 | 75 | 75 | 55 | 56 |
| Cells Per Inch | 35–40 | 40–45 | 30–35 | 30–35 | 35–40 | 30–35 | 35–40 |
| Density, pcf | 1.65 | 1.60 | 1.29 | 1.17 | 1.19 | 1.75 | 1.70 |
| Comments | — | — | — | — | — | — | — |

| EXAMPLE | XCVIII | XCIX | C |
|---|---|---|---|
| Polyester Polyol, parts | 100 | 100 | 100 |
| Water, parts | 5.5 | 5.0 | 5.5 |
| Catalyst, parts | 2.0 | 2.0 | 2.0 |
| Hexadecyldimethylamine, parts | 0.3 | 0.3 | 0.3 |
| Organosiloxane Composition Surfactant Type | PP | PP | — |
| Organosiloxane Composition Surfactant, parts | 1.5 | 1.6 | — |
| Flame Retardant, parts | — | — | — |
| Tolylene Diisocyanate (Index 105), parts | 64.3 | 59.2 | 64.3 |
| Cream Time, Seconds | 7.0 | 7.0 | — |
| Rise Time, Seconds | 74 | 66 | — |
| Cells Per Inch | 20–25 | 20–25 | — |
| Density, pcf | 1.21 | 1.37 | — |
| Comments | — | — | Collapse |

TABLE J

EVAULATION OF ORGANOSILOXANE COMPOSITIONS IN FLEXIBLE POLYESTER POLYURETHANE FOAM FORMULATIONS (INDUSTRIAL SCALE MACHINE)

| EXAMPLE | CI | CII | CIII | CIV | CV | CVI |
|---|---|---|---|---|---|---|
| Polyester Polyol, parts | 100 | 100 | 100 | 100 | 100 | 100 |
| Water, parts | 5.0 | 5.0 | 5.0 | 4.0 | 4.0 | 5.0 |
| Catalyst, parts | 2.0 | 2.0 | 2.0 | 2.0 | 2.0 | 2.0 |
| Hexadecyldimethylamine, parts | 0.3 | 0.3 | 0.3 | 0.3 | 0.3 | 0.3 |
| Organosiloxane Compostion Surfactant Type | I | I | PP | PP | PP | — |
| Organosiloxane Composition Surfactant, parts | 1.5 | 1.5 | 1.5 | 2.0 | 2.0 | — |
| Flame Retardant, parts | — | — | — | — | — | — |
| Tolylene Diisocyanate (Index 105), parts | 59.18 | 59.18 | 59.18 | 59.18 | 59.18 | 59.18 |
| Cream Time, Seconds | 7.0 | 7.0 | 6.0 | 8.0 | 8.0 | — |
| Rise Time, Seconds | 56 | 51 | 56 | 72 | 68 | — |
| Cells Per Inch | 35–40 | 15–20 | 30–35 | 30–35 | 15–20 | — |
| Density, pcf | 1.51 | 1.49 | 1.28 | 1.3 | 1.28 | — |
| Breathability, SCFM | 1.1 | 0.55 | 0.30 | 1.2 | 0.18 | — |
| ILD, 25 | 59 | 65 | 49 | 46 | 56 | — |
| 65 | 121 | 128 | 100 | 92 | 113 | — |
| Compression Set, 90 | 25 | 18 | 27 | 31 | 23 | — |
| Tensile Strength | 22 | 17 | 26 | 19 | 19 | — |
| Elongation % | 168 | 131 | 282 | 234 | 204 | — |
| Tear Resistance | 3.6 | 3.3 | 4.9 | 4.2 | 4.1 | — |
| Comments | — | — | — | — | — | Collapse |

The data of Table I and Table J demonstrates that Organosiloxane Composition I is also an effective stabilizer of low density flexible polyester polyurethane foam formulated in an industrial scale machine as evidenced by generally excellent physical properties including high cell counts, and further possesses the desirable property of wide processing latitude in an industrial scale machine. This is evidenced from the available Examples in which the organosiloxane composition, when employed in various concentration amounts of wide latitude, produces low density flexible polyester polyurethane foams having desirable physical properties including high cell counts. As evidenced from the data of Example XCVII, comparative Organosiloxane Composition PP is capable of stabilizing low density flexible polyester polyurethane foam in an industrial scale machine having desirable physical properties at a very narrow concentration range. The remaining Examples in which comparative Organosiloxane Composition PP is utilized as the foam stabilizing surfactant demonstrate foams having some desirable physical properties but possessing very low or moderate cell counts.

From the data of Table I and Table J as well as the other data presented in the Examples hereinabove, it is evident that Organosiloxane Compositions A through O possess a highly desirable combination of properties including the ability to provide flexible polyester polyurethane foam having excellent physical properties (e.g., high cell counts) and the further desirable property of wide processing latitude or at least moderately wide processing latitude in low density flexible polyester polyurethane foam formulation.

What is claimed is:

1. A composition consisting essentially of (a) an organosiloxane composition selected from the group consisting of:

(I) a cyano-organosiloxane composition having the average formula,

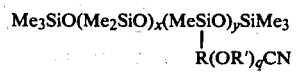

wherein Me is a methyl group, R is an alkylene group of from 2 to 6 carbon atoms inclusive, R' is an alkylene group of from 2 to 4 carbon atoms inclusive, x has a value of at least 1, y has a value of at least 1, q has a value of 0 or 1, the ratio of x to y has a value from 1 to 4 inclusive, and the molecular weight is from about 400 to about 1500;

(II) an ether-organosiloxane composition having the average formula,

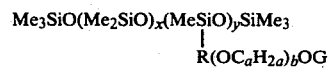

wherein Me is a methyl group, R is an alkylene group of from 2 to 6 carbon atoms inclusive, G is an organic cap, x has a value of at least 1, y has a value of at least 1, a has an average value from 2 to 4 inclusive, b has an average value from 2 to 4 inclusive, the ratio of x to y has a value from about 400 to about 1500;

(III) a hydroxy-organosiloxane composition having the average formula,

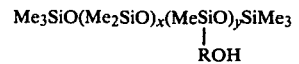

wherein Me is a methyl group, R is an alkylene group of from 2 to 6 carbon atoms inclusive, x has a value of at least 1, y has a value of at least 1, the ratio of x to y has a value from 1 to 4 inclusive, and the molecular weight is from about 400 to about 1500; and (IV) a phenyl-organosiloxane composition having the average formula,

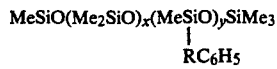

wherein Me is a methyl group, R is an alkylene group of from 2 to 6 carbon atoms inclusive, x has a value of at least 1, y has a value from 1 to 4 inclusive, and the molecular weight is from about 400 to about 1500;
(b) an organic acidic component and (c) at least one of the following components: (i) a water soluble organic surfactant of the nonionic, anionic, cationic or amphoteric types including combinations thereof; (ii) a water soluble glycol; and (iii) an oxidative/hydrolytic inhibitor and wherein the organosiloxane composition is present in an amount of from 10 to 80 parts by weight per 100 parts by weight of the total composition, the organic acidic component is present in an amount of 5 to 90 parts by weight per 100 parts by weight of the organosiloxane composition, the water soluble organic surfactant and water soluble glycol are present in a combined amount of from 5 to 90 parts by weight per 100 parts by weight of the organosiloxane composition, and the oxidative/hydrolytic inhibitor is present in an amount of about 1 part by weight per 100 parts by weight of the total composition.

* * * * *

UNITED STATES PATENT AND TRADEMARK OFFICE
CERTIFICATE OF CORRECTION

PATENT NO. : 4,331,555
DATED : May 25, 1982
INVENTOR(S) : F.O. Baskent et al.

It is certified that error appears in the above—identified patent and that said Letters Patent is hereby corrected as shown below:

Column 45, line 1, the formula should be

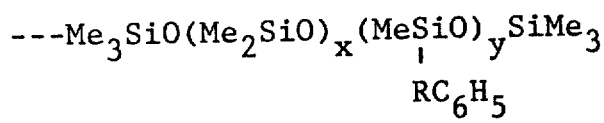

$$\text{---Me}_3\text{SiO(Me}_2\text{SiO)}_x(\underset{\underset{\text{RC}_6\text{H}_5}{|}}{\text{MeSiO}})_y\text{SiMe}_3$$

Signed and Sealed this

Twenty-sixth Day of April 1983

[SEAL]

Attest:

GERALD J. MOSSINGHOFF

Attesting Officer    Commissioner of Patents and Trademarks